US007363169B2

(12) United States Patent
Dougherty et al.

(10) Patent No.: US 7,363,169 B2
(45) Date of Patent: Apr. 22, 2008

(54) SIMULATING MICROARRAYS USING A PARAMETERIZED MODEL

(75) Inventors: Edward R. Dougherty, College Station, TX (US); Yoganand Balagurunathan, College Station, TX (US); Yidong Chen, Rockville, MD (US)

(73) Assignees: United States of America as represented by the Secretary of the Department of Health and Human Services, Washington, DC (US); The Texas A&M University System, College Station, TX (US)

( * ) Notice: Subject to any disclaimer, the term of this patent is extended or adjusted under 35 U.S.C. 154(b) by 256 days.

(21) Appl. No.: 10/501,848

(22) PCT Filed: Jan. 21, 2003

(86) PCT No.: PCT/US03/01784

§ 371 (c)(1),
(2), (4) Date: Jul. 16, 2004

(87) PCT Pub. No.: WO03/097850

PCT Pub. Date: Nov. 27, 2003

(65) Prior Publication Data

US 2005/0164187 A1 Jul. 28, 2005

Related U.S. Application Data

(60) Provisional application No. 60/350,326, filed on Jan. 18, 2002.

(51) Int. Cl.
*G06F 17/00* (2006.01)
(52) U.S. Cl. ...................................................... 702/19
(58) Field of Classification Search ...................... None
See application file for complete search history.

(56) References Cited

OTHER PUBLICATIONS

Balagurunathan et al., "A Random Signal Model for cDNA Microarrays," Proceedings of SPIE, vol. 4266, pp. 163-170, 2001.
Chen et al., "Ratio-Based Decisions and the Quantitative Analysis of cDNA Microarray Images," Journal of Biomedical Optics, vol. 2, No. 4, pp. 364-374, Oct. 1997.
Duggan et al., "Expression Profiling Using cDNA Microarrays," Nature Genetics Supplement, vol. 21, pp. 10-14, Jan. 1999.
Alizadeh, et al. "Distinct Types of Diffuse Large B-Cell Lymphoma Identified by Gene Expression Profiling", Nature. Feb. 3, 2000, 403(6769); pp. 503-511.
Ben-Dor, et al. "Clustering Gene Expression Patterns", Hewlett-Packard Company, HPL-98-190. Nov. 4, 1998, pp. 1-12 with cover.
DeRisi, et al. "Use of a cDNA Microarray to Analyse Gene Expression Patterns in Human Cancer", Nature Genetics. Dec. 1996, 14(5); pp. 457-460.
Dougherty, E., "Chapter 5 Random Models", *Random Processes for Image and Signal Processing*. 1999; pp. iv, 483-573.
Eisen, et al. "Cluster Analysis and Display of Genome-Wide Expression Patterns", Proceedings of the National Academy of Science USA. Dec. 1998, 95; pp. 14863-14868.
Golub, et al. "Molecular Classification of Cancer: Class Discovery and Class Prediction by Gene Expression Monitoring", Science. Oct. 15, 1999, 286(5439); pp. 531-537.
Greenberg, D., "A Framework for Realistic Image Synthesis: How to Generate Synthetic Images with Enough Fidelity to be Truly Accurate Representations of Real-World Scenes. Not Just Amazingly Appealing Imagery", Communications of the ACM. Aug. 1999, 42(8); pp. 45-53, with cover.
Hedenfalk, et al. "Gene-Expression Profiles in Hereditary Breast Cancer", The New England Journal of Medicine. Feb. 22, 2001, 344(8); pp. 539-548.
Hertzmann, et al. "Image Analogies", International Conference on Computer and Interactive Techniques Proceedings of the 28th annual conference on Computer Graphics and Interactive Techniques, ACM Press. Aug. 2001; pp. 327-340.
Jeulin, D., ed., "Advances in Theory and Applications of Random Sets" (abstract and table of contents only), World Scientific Publishing Company. 1997; pp. 1-3.
Kerr, et al. "Statistical Design and the Analysis of Gene Expression Microarray Data", Genet. Res. Apr. 2001, 77(2); pp. 123-128.
Khan, et al. "Classification and Diagnostic Prediction of Cancers Using Gene Expression Profiling and Artifical Neural Networks", Natural Medicine. Jun. 2001, 7(6); pp. 673-679.
Kim, et al. "Multivariate Measurement of Gene-Expression Relationships", Genomics. 2000, 67; pp. 201-209.
Spellman, et al. "Comprehensive Identification of Cell Cycle-Regulated Genes of the Yeast *Saccharomyces cerevisiae* by Microarray Hybridization", Molecular Biology of the Cell. Dec. 1998, 9(12); pp. 3273-3297.
Tamayo, et al. "Interpreting Patterns of Gene Expression with Self-Organizing Maps: Methods and Application to Hematopoietic Differentiation", Proceedings of the National Academy of Sciences of the USA. Mar. 1999, 96(6); pp. 2907-2912, with cover.

*Primary Examiner*—James Martinell
(74) *Attorney, Agent, or Firm*—Klarquist Sparkman, LLP

(57) ABSTRACT

Simulating a microarray includes defining a number of parameters. A microarray is generated according to the parameters using an imaging procedure. The microarray is compared to a known value, and the imaging procedure is evaluated in response to the comparison. A simulated microarray image can be generated based on parameters. The simulated microarray can be associated with known values. An imaging procedure is applied to the simulated microarray image to generate observed values. The known values (e.g., intensities) can be compared to the observed values to evaluate the imaging procedure.

33 Claims, 18 Drawing Sheets

Figure 1. Above figure shows the steps involved in generating the microarray

Fig 4 cDNA microarray spot model.

Fig. 15 Example shows the 3×3 convolution kernel for (a) flat function and (b) pyramidal function.

Fig. 16 Example shows the 3D profile before and after smoothing. Where (a) noised, (b) flat function, (c) pyramid function.

FIG. 17
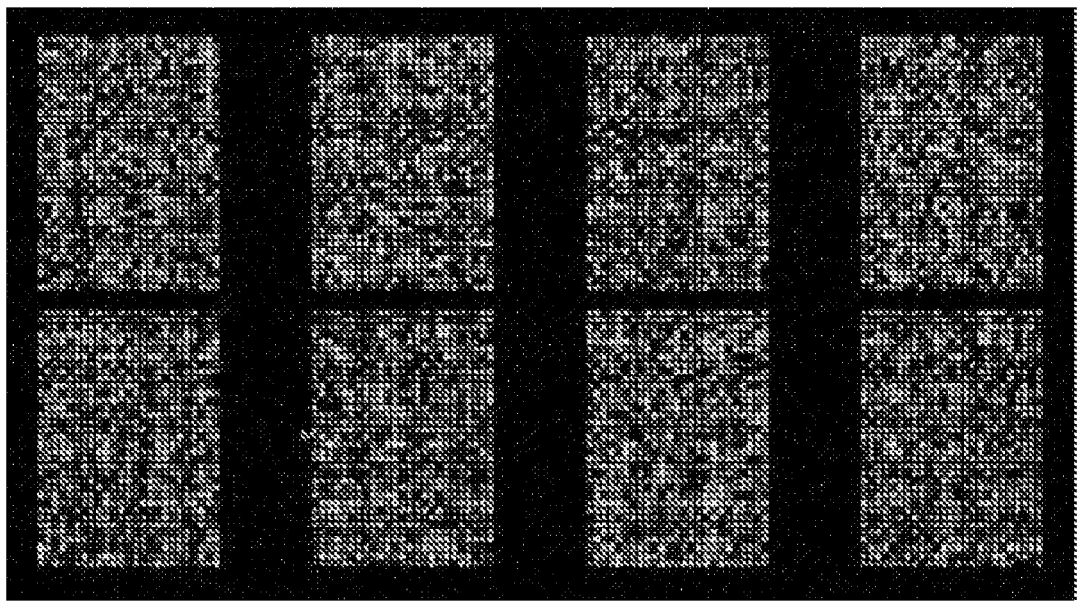
(a)
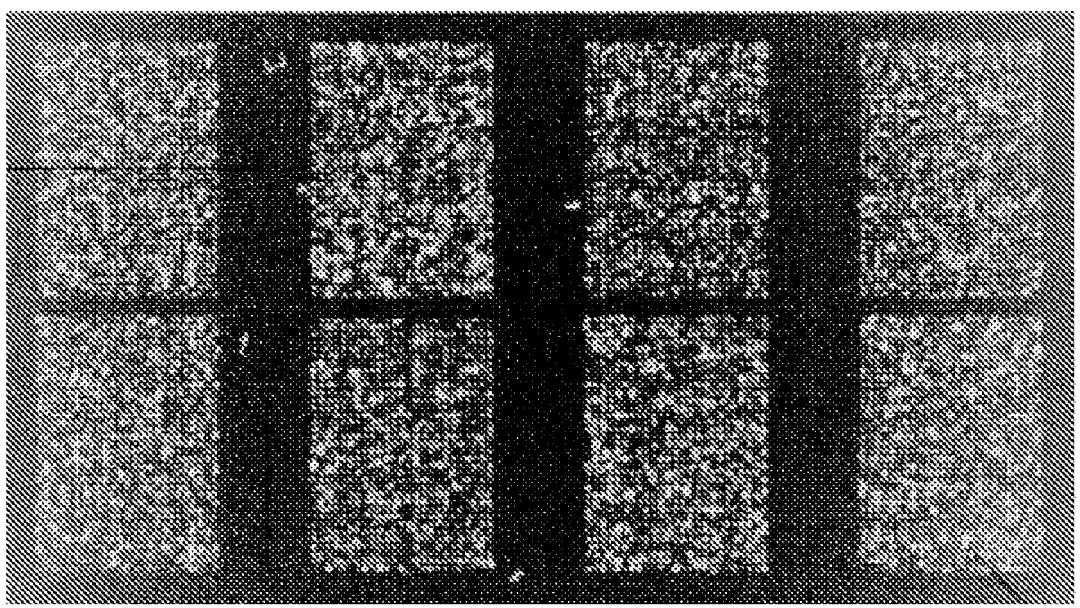
(b)

SIMULATING MICROARRAYS USING A PARAMETERIZED MODEL

RELATED APPLICATION DATA

This is the U.S. National Stage of International Application No. PCT/US03/01784, filed Jan. 21, 2003, which was published in English under PCT Article 21(2), which in turn claims the benefit of U.S. Provisional Patent Application No. 60/350,326, filed Jan. 18, 2002.

TECHNICAL FIELD

The technical field relates generally to the field of microarrays and more specifically to simulating microarrays using a parameterized model.

BACKGROUND

Since the inception of cDNA microarray technology [1] as a high throughput method to gain information about gene functions and characteristics of biological samples, many applications of the technology have been reported [2-10]. With the improvement of the technology, including fabrication, fluorescent labeling, hybridization, and detection, many computer software packages for extracting signals arising from tagged mRNA hybridized to arrayed cDNA locations have been designed and applied in various experiments [11-12]. As reported in [11], a target detection procedure has been implemented that utilizes manually specified target arrays, extracts the background via the image histogram, predicts target shape by mathematical morphology, and then evaluates the intensities from each cDNA location and its corresponding ratio quantity.

While most software packages are satisfactory for routine image analysis and the extraction of information regarding phenomena with highly expressed genes, the desire to discover subtle effects via microarray experiments will ultimately drive experiments towards the limit of the technology [13], with less starting mRNA and/or more weakly expressed genes. Weak signals and their interaction with background fluorescent noise are most problematic. Problems include the nonlinear trend in expression scatter plots, fishtailing at lower signal range, low measurement quality of expression levels due to uneven local background, and small cDNA-deposition areas. These artifacts, or sources of uncertainty, creep into higher-level statistical data analyses, such as clustering and classification, raising concerns about their validity.

Numerous remedies have been proposed, such as carefully designed experiments in which duplications are used to minimize the uncertainty [14]. However, given the scarcity of certain biological samples, large duplications of experiments are often impractical. Consequently, generating cDNA microarrays has posed challenges.

SUMMARY

According to one embodiment of the present invention, simulating a microarray includes defining a number of parameters. A microarray is generated according to the parameters using an imaging procedure. The microarray is compared to a known value, and the imaging procedure is evaluated in response to the comparison.

According to one embodiment of the present invention, cDNA microarrays provide simultaneous expression measurements for thousands of genes that are the result of processing images to recover the average signal intensity from a spot composed of pixels covering the area upon which the cDNA detector has been put down. The accuracy of the signal measurement depends on using an appropriate procedure to process the images. This includes determining spot locations and processing the data in such a way as to take into account spot geometry, background noise, and various kinds of noise that degrade the signal. This document presents a stochastic model for microarray images. There can be over twenty model parameters, that control the signal intensity, spot geometry, spot drift, background effects, and the many kinds of noise that affect microarray images owing to the manner in which they are formed. The parameters (e.g., each of them) can be governed by a probability distribution. The model can be used to analyze the performance of image procedures designed to measure the true signal intensity because the ground truth (signal intensity) for each spot is known. The levels of foreground noise, background noise, and spot distortion can be set, and procedures can be evaluated under varying conditions.

Certain embodiments of the invention may provide technical advantages. A technical advantage of one embodiment is providing a model to evaluate imaging procedures and understand process interactions. Modeling and simulation of microarray image formation is a key to benchmarking various signal processing tools being developed to estimate cDNA signal spots. Using a model to describe the signal ground truth not only helps in evaluating these tools, but also facilitates the understanding of various process interactions.

Other technical advantages are readily apparent to one skilled in the art from the following figures, descriptions and claims. Embodiments of the invention may include none, some, or all of the technical advantages.

BRIEF DESCRIPTION OF THE DRAWINGS

For a more complete understanding of the present invention and for further features and advantages, reference is now made to the following description, taken in conjunction with the accompanying drawings, in which:

FIG. 17 illustrates a full size array simulation with different parameter settings and includes FIGS. 17(a) and 17(b);

DETAILED DESCRIPTION

1. Introduction

Figure 1:
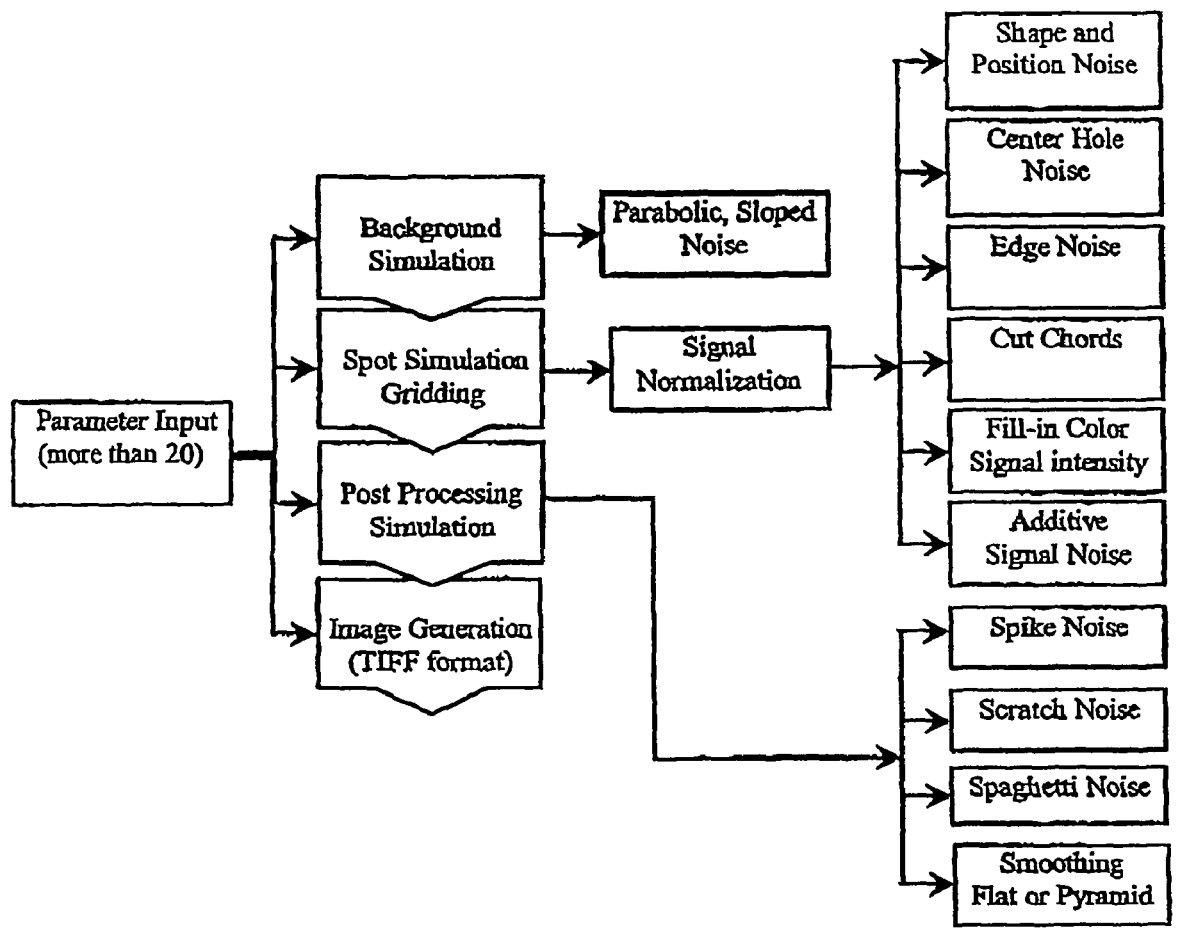
FIG. 1 is a flowchart illustrating an example method for generating a microarray.

To improve detection and quantification of weak targets, it is important to understand the entire process of microarray formation, from fabrication to the scanning microscope. Use of the knowledge that the average intensity of the background fluorescence is normally distributed to help design a background detection procedure is one example of incorporating prior knowledge into detection methods [16].

A complex electrical-optical-chemical process is involved in cDNA-microarray technology, from fabrication of the cDNA slide, to preparing the RNA, to hybridization, to the capture of images created from excitation of the attached fluors. This complex process possesses multiple random factors. Images arising from it are processed digitally to obtain the gene expression intensities and/or ratios that quantify relative expression levels [11]. The efficacy of the analysis to be carried out on the ratios, be it clustering [3,17-19], classification [5,10], prediction [20,21], or some other, depends on the ability of the imaging procedure to extract sufficiently accurate and consistent intensity levels from the spots.

As is common in imaging applications, it is difficult (or perhaps impossible) to utilize physical ground truth as a standard by which to evaluate procedure performance. Hence, it is common to proceed by modeling the imaging process to simulate the various aspects of the real image process [22-24]. Image processing procedures can be applied to the simulated process to evaluate their performance. One might also concurrently adjust the model parameters to see how changing various random components of the formation process impacts upon the final images, and therefore the ability to extract meaningful information. For instance, a procedure might have biases at low signal intensities or high noise intensities that are not present at higher signal intensities or lower noise intensities. Here it should be recognized that "ground truth" refers to the true signal intensity, not the actual quantity of mRNA in the sample corresponding to the DNA in the spot.

Modeling any but a very simple physical process is a very challenging task. A physical process is typically influenced, directly or indirectly, by forces whose interrelation is unknown. The resulting model will be a random process. Each realization of the model depends on random variables chosen according to various model distributions. A good quantifiable model may be required to approximate the physical process and to have realistic variability to describe the randomness of the system.

In the present work, microarray image formation cam be modeled by a series of random processes influenced by almost two dozens parameters. The modeling process is described in terms of the various random variables that determine spot size, shape, and intensity, as well as variables that affect the background, including noise. Each random variable is associated with a distribution. In some cases, one may select the parameters of the distribution (such as mean and variance for a normal distribution) to reflect the images of interest, such as brightness, spot size, noise intensity, etc. In other cases, the distribution of a random variable is dependent on the outcome of some other variable, and it is possible that the parameters governing the distribution of a random variable may themselves be random variables.

Although various distributions to govern the variables in the model are postulated, one may wish to use other distributions to characterize the signal and noise distributions. Moreover, the experimenter is free to choose the parameters of the distributions. Microarray, technology is evolving rapidly, and there are already many variations of the technology in use. Hence, model flexibility is mandatory. For instance, for a microarray system that does not produce doughnut holes in the spots, the variables associated with the hole can be nullified. In the case of a stable system in use without change for a sufficiently long period to produce a large number of images, one can apply statistical estimation to determine some model parameters, such as those for spot radius. Clearly, these estimates will only be of value to the specific system from which they have been derived. Hence, they remain outside the simulation package per se.

The simulation procedure produces spots at a preset grid of locations that resemble the actual microarrray. Blocks can correspond to a specific pin of the robot hand, and the inter-block variation is modeled in the simulation by allowing various model parameters to be randomized by block. At the start of each new block, the parameters of the spots can be reset. The intention of the printing process is that spots possess regular circular shapes. Due to mechanical fatigue, the adhesion process for the DNA solution concentration, and bio-chemical interactions, various perturbations are possible in array preparation, printing, and scanning. Various features of the model simulate these random perturbations.

The simulation procedure may be implemented in a computer using any suitable configuration of hardware and/or software. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

2. Simulation of cDNA Microarrays

The simulation of the cDNA microarray images is designed for two-color fluorescent systems with a scanning confocal microscope. A block diagram of the overall simulation process is given in FIG. 1, which includes four main modules: fluorescent background simulation, simulation of cDNA target spot generation, post-processing simulation, and TIFF image output. Each simulation module contains many sequential steps (such as spot formation) or alternative steps (such as different background fluorescence). Each step is discussed according to the order in FIG. 1 in the following subsections.

2.1. Background Simulation

The fluorescent background level is an important part of expression-level estimation, since the additive model is routinely used to subtract the local background from the signal intensity measurement. It is understood that when the signal is sufficiently low, the interaction between the fluorescent background and signal affect the estimation process in most image analysis programs, resulting in lower measurement quality in the expression ratio. Many factors contribute to the observed fluorescent background: auto-fluorescence from the glass surface or the surface of the detection instrument, non-specific binding of fluorescent residues after hybridization, local contamination from post-hybridization slide handling, etc. A perfect system would yield a flat background possessing a normal distribution, while a microscope without an auto-focus mechanism may produce a slanted background level if the slides are loaded unevenly. Some other extreme hybridization condition may cause higher non-specific hybridization to the edge of the hybridization chamber, which effectively creates a parabolic surface of background noise. The local contamination is left to the processing module in Section 2.4.

The background derived from surface fluorescence upon laser excitation is usually governed by the Poisson process, which can be approximated by a normal distribution when the arrival rate, or the accumulation of photons, is large enough [16]. This property can be readily accessed by the histogram of any background region of the microarray images. Therefore, background noise is simulated by a normal distribution whose parameters are randomly chosen to describe the process: $I_b \sim N(\mu_b, \sigma_b^2)$. If multiple arrays are desired, the inter-array difference is modeled by a uniform distribution: $\mu_b \sim U(a, b)$. $\sigma_b$ is given as a multiple of $\mu_b$: $\sigma_b = k_b \mu_b$. Typically, $k_b$ is about 10% of the mean background level.

Figure 2:
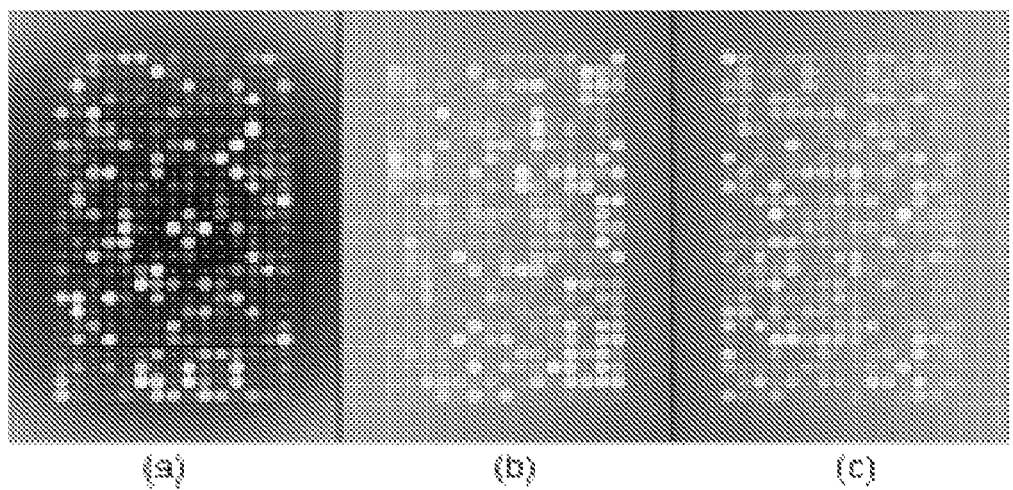
FIG. 2 illustrates background noises and includes FIGS. 2(a), 2(b), and 2(c)

Rather than be constant across the entire microarray, the mean of the background noise may vary owing to various scanning effects. It can take different shapes: parabolic, positive slope, or negative slope. In this case a function $g(x, y)$ is first generated (parabolic, positive slope, or negative slope) to form a background surface and normal noise is added to it pixel wise. Thus, the background intensity is of the form $I_b \sim N(\mu_b, \sigma_b^2)$ with $\mu_b = \gamma g(x, y)$, where $\gamma \sim U(a, b)$ is the targeted background noise level. Background deviation is set independently for each channel: $\sigma_{b_1} = k_{b_1} \mu_b$ and $\sigma_{b_2} = k_{b_2} \mu_b$. FIG. 2 shows various background noises with the background deviation factor set at $k_{b_1} = k_{b_2} = 0.1$ (10%). The signal-to-noise ratio (SNR) is set at 1.0 for the slides of FIG. 2. The slides have the following settings: FIG. 2(a), Parabolic background noise, FIG. 2(b), Positive slope background, FIG. 2(c), Negative slope background all with global noise parameter.

Figure 3:
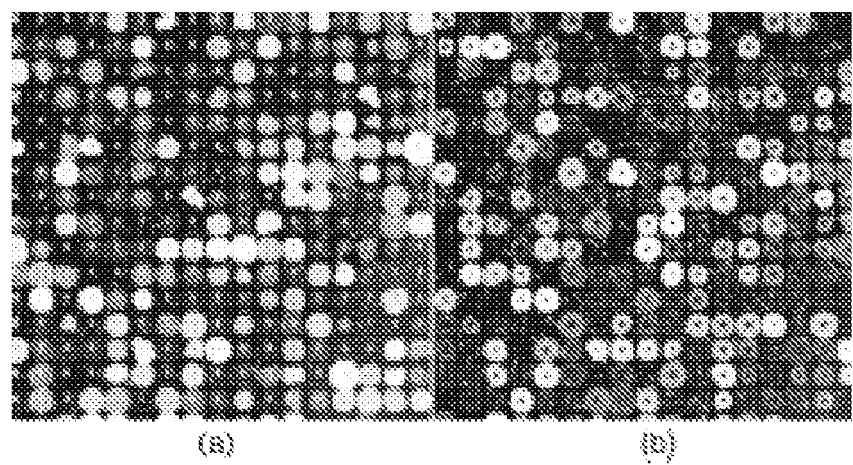
FIG. 3 illustrates noise settings and includes FIGS. 3(a) and 3(b)

In many practical examples, the non-specific hybridization at the target location may be different from its peripheral region. Although one may have trouble pin-pointing this particular observation under normal conditions owing to signal interference, it is sometimes unmistakable when locations assumed to be weakly expressed, or not expressed at all, carry some non-zero readouts, or the intensity in the center is stronger than the doughnut-ring if the printed target is doughnut-shaped. This artifact is simulated under a gradient noise condition by allowing the background for the center holes to be at higher levels than the signal intensities. Hence, there is an option to use global background or local background information to set the noise parameter for the center hole. FIG. 3 shows the effects of using local and global background parameters. The examples of FIG. 3 show different noise settings for a spot's inner hole. FIG. 3(a) uses a global background parameter to fill the center hole. FIG. 3(b) uses local background for filling the center hole. The background noise is set to sloped type with SNR of 1.5. This effect may not appear everywhere in a simulated image; however, it is often sufficient to require appropriate procedure design in the image analysis program to lessen the penalty. The effects of weak targets will be further studied in later sections.

2.2. Spot Simulation cDNA deposition routinely follows a rigid grid defined by the robotic print pattern. The simulation procedure produces spots at preset grid locations that resemble the actual microarray. In principle, print-tips are manufactured uniformly; however, their microscopic morphologies, and thus their deposition-binding behaviors, are noticeably different. Each block corresponds to a specific print-tip of the robot hand. To take tip variability into account, within each block the spot variation is governed by block parameters, which themselves are random variables. At the start of each new block, the spot parameters are reset according to these random variables.

Figure 4:
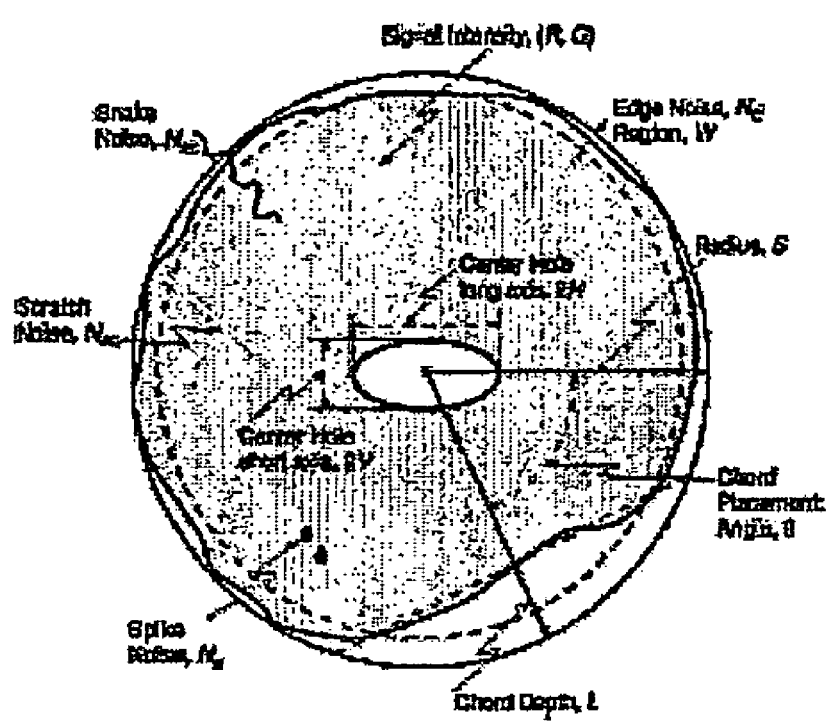
FIG. 4 illustrates an example cDNA microarray spot model.

The key simulation of this study is devoted to the cDNA targets, which nominally possess a circular shape. Owing to many factors, the actual shape may be highly non-circular. The model takes various random perturbations into account: (1) radius variation, (2) spot drifting locally, (3) center core variation, (4) chord removal, (5) edge noise, (6) edge enhancement, (7) signal intensity, and (8) signal response transform. FIG. 4 shows a schematic drawing for the cDNA target simulation. The variables in the figure are explained in the following eight subsections.

2.2.1. Variation of Radius

Figure 5:
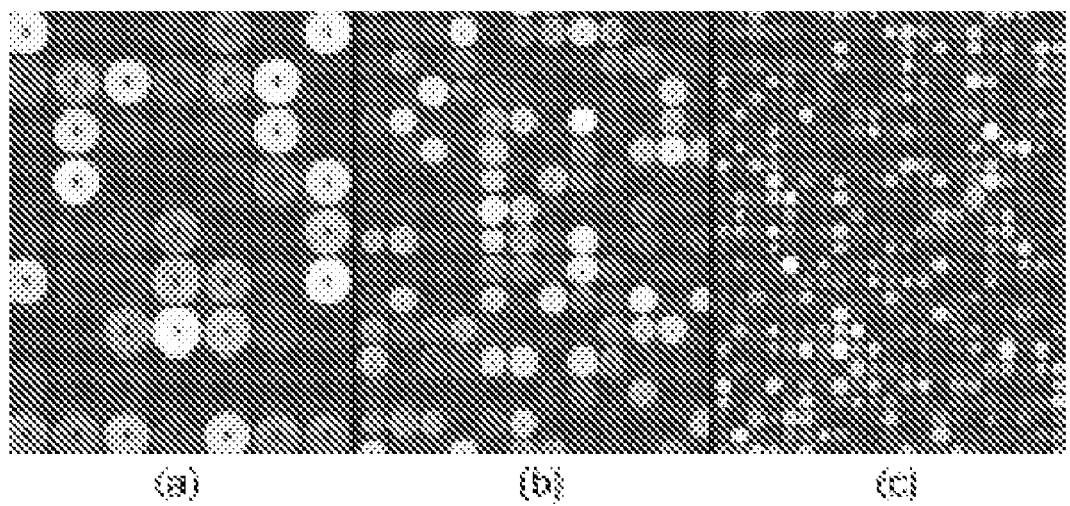
FIG. 5 illustrates variability in spot size and spread from the spot size and includes FIGS. 5(a), 5(b), and 5(c)

Prior to distortion and noise, the cDNA deposition spot is considered to be circular with random radius S. The mean of the radius is set according to the array density and its variance relates to the consistency of spot size. S is modeled by a normal distribution having mean $\mu_S$ and variance $\sigma_S^2$, $S \sim N(\mu_S, \sigma_S)$, with the standard deviation being a pre-determined proportion, $k_S$, of the mean, or $S \sim N(\mu_S, k_S \mu_S)$. The radius mean is set for every block, and randomized over a small range within the array. The block randomness of $\mu_S$ is modeled by a uniform distribution, $\mu_S \sim U(s_a, s_b)$. FIG. 5 shows parts of blocks with spot radii depending on the number of spots in a block. FIGS. 5(a), 5(b), and 5(c) show the variability in spot size and spread from its size. The spot radius distribution is automatically set depending on the number of spots in a block (width, height), where (col, row) denotes the number of columns and rows within the block, respectively. In FIG. 5(a), the block portion is for size (10,15), $\mu_S \sim U[23.3\ 24.3]$. In FIG. 5(b), the block portion is for size (20, 25), $\mu_S \sim U[12.6\ 13.61]$. In FIG. 5(c), the block portion is for size (25, 45), $\mu_S \sim U[5.45\ 6.451]$. Standard deviation $k_S$, equals 1%, 7%, and 20% of radius, respectively. Occasionally, a spot overlaps with it neighbors (FIG. 5(c)) when $k_S$ is set to a larger proportion. This situation simulates the condition where too much cDNA solution is deposited and/or the drying process may be slow in comparison to the liquid spreading process.

Figure 6:
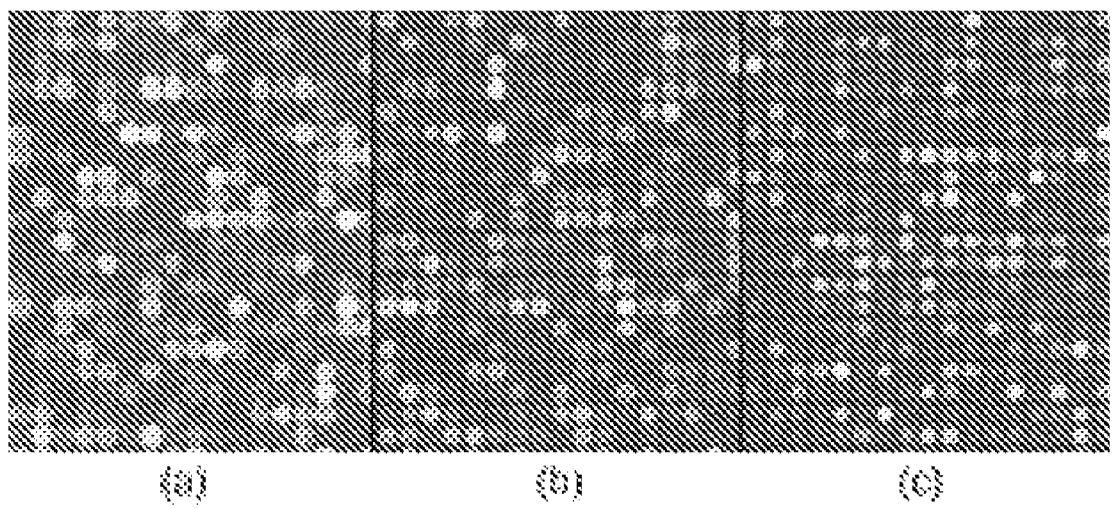
FIG. 6 illustrates inter-spot grid spacing and includes FIGS. 6(a), 6(b), and 6(c)

Depending on the robot arm and printing ability of the pins, the inter-spot distance, $G_{sp}$, may vary. Owing to the physical mechanics of the robot arm, the block size (pixel units) is fixed in most cases. The inter-spot distance can be set to accommodate spot size and random variation in spot radii. The effects are illustrated in FIG. 6, where the number of rows and columns are fixed. FIG. 6 shows inter-spot grid spacing. FIG. 6(*a*) shows $G_{sp}$, =3 pixels, $\mu_S$~U[9.5 10.5]. FIG. 6(*b*) shows $G_{sp}$, =6 pixels, $\mu_S$~U[8 9]. FIG. 6(*c*) shows $G_{sp}$, =10 pixels, $\mu_S$~U[6.5 7.5]. The example shown has (35, 20) rows, columns respectively with $k_S$, =0.05.

2.2.2. Spot Drift

During the fabrication stage, the deposition of cDNA targets may not follow the pre-defined grid, owing to print-tip rotation, vibration, or other mechanical causes. Other drifts are attributed to the slide's coating properties and the drying rates of the cDNA. This displacement is modeled by possible random translations in the horizontal and vertical directions. Each spot has an equal probability, $P_D$, of drifting. If a spot is selected for drift, then the amounts of drift in both directions are random multiples of the current spot radius. The horizontal and vertical multiples, $\delta_x$ and $\delta_y$, called the "drift levels," are uniformly distributed: $\delta_x$, $\delta_y$, ~U($d_a$, $d_b$). The horizontal and vertical drifts are $D_x = \delta_x S$ and $D_y = \delta_y S$, respectively. Inter-spot distance can be set according to the drift to minimize the impact of overlapping spots.

Figure 7:
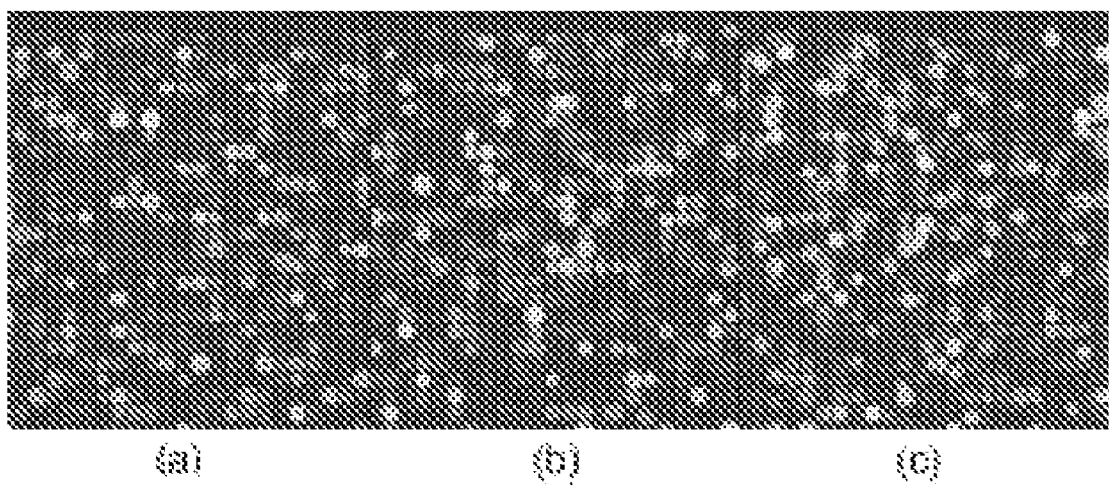
FIG. 7 illustrates an effect of a radius drift variation and includes FIGS. 7(a), 7(b), and 7(c)

Some microarray scanners capture two fluorescent signals in two passes of scanning. Due to the mechanical homing error, the two fluorescent channels may not align exactly. In these settings, some small offset between the two channels can be observed. This offset may occur at sub-pixel resolution. To simulate this offset, the model offers a random offset between the centers of the two channels. It is achieved by randomly offsetting the spot center of the second channel by one pixel in either of the horizontal and vertical directions. These offsets are applied following application of the spot drifts in the first channel. FIG. 7 illustrates the spot drift. FIG. 7 shows the effect of radius drift variation ($P_D$, $R_{d1}$, $R_{d2}$). The settings for FIG. 7(*a*) are (0.05, 5, 100). The settings for FIG. 7(*b*) are (0.25, 15, 100). The settings for FIG. 7(*c*) are (0.5, 50, 100). As the activation probability with drift range is set higher, a spot drifts away from its center.

It is essential for the image analysis procedure to determine the exact location of the target spot so that an accurate measurement can be carried out without the interference of the dusty noise around the targets. Some procedures rely on the assumption that the printing grid is rigid with the cDNA target in the center; others assume an imperfect printing process such that a deformable grid may be needed. The former method is faster and noise insensitive, but may be inaccurate if the slides are fabricated with many displacements; the latter is robust in target position detection, but can be rather slow and noise sensitive. In either case, the simulation outcome will provide a set of evaluation images to assess the tolerance of both procedure designs. The slightly misaligned channels also pose a challenge to signal intensity extraction.

2.2.3. Doughnut Hole

Owing to the impact of the print-tip on the glass surface, or possibly due to the effect of surface tension during the drying process, a significantly lesser amount of cDNA can be deposited in, or attached to, the center of the targets. Consequently, the center of the target emits less fluorescent photons, thereby giving a target the doughnut shape. It is critical for signal intensity extraction whether or not the center hole is assumed, particularly when the signal is weak and there is a large center hole. The simulation allows one hole in the center with varying size, along with a possible off-center displacement. It is not necessary to simulate more than one hole, since the mathematical properties for signal and noise estimation are preserved with this simple condition.

An elliptical shape models the inner core with random horizontal and vertical axes, H and V. The axes are modeled by a normal distribution whose parameters are randomized for each block within a given array: H~N($\mu_H$, $\sigma_H$) and V~N($\mu_V$, $\sigma_V$). Inter-array variability in these radius distributions is modeled by uniformly distributed means: $\mu_H$~U($a_H$, $b_H$), $\sigma_H = \alpha_1 \mu_H$ and $\mu_V$~U($a_V$, $b_V$), $\sigma_V = \alpha_2 \mu_V$, where the controlling ratios vary over a range, $\alpha_1$, $\alpha_2$~U($P_a$, $P_b$). The choice of the parameters governs the hole shapes. The center position of a hole is allowed to drift over a range. The shape is unaffected by the drift because the mechanical print-tip to surface contact is unaffected. The amount of drift in the horizontal and vertical directions is modeled similarly to spot drift. Drift levels are set at every block, ($\delta c_{xR}$, $\delta c_{yR}$) and ($\delta c_{xG}$, $\delta c_{yG}$), for both channels. The amount of drift is first selected from a uniform range, $\delta c$~U[i, j]. Channel and inter-channel drifts are modeled by a uniform variate and set for each block: $\delta c_{xG} = \delta c \times U[-1, 1]$, $\delta c_{yG} = \delta c \times U[-1, 1]$, $\delta c_{xR} = \delta c_{xG} + U[-1, 1]$, and $\delta c_{yR} = \delta c_{yG} + U[-1, 1]$.

2.2.4. Chord Removal

Since parts of a spot can be washed off due to various physical effects during the hybridization and washing stages, pieces of a spot may be missing. This condition is simulated for the same reasons that the center hole is simulated. This irregularity is modeled by randomly cutting chords from the circular spots. The number of chords to be removed, $N_c$, for a spot is selected from a discrete distribution, {0, 1, 2, 3, 4}, where the elements of the distribution occur with probabilities $p_0$, $p_1$, $p_2$, $p_3$, and $p_4$, respectively. For images with very few pieces cut off, the zero-chord probability $p_0$ is very high, and the three- and four-chord probabilities are close to 0 (possibly equal to 0). To model inter-array variability, the probabilities can be treated randomly.

Figure 8:
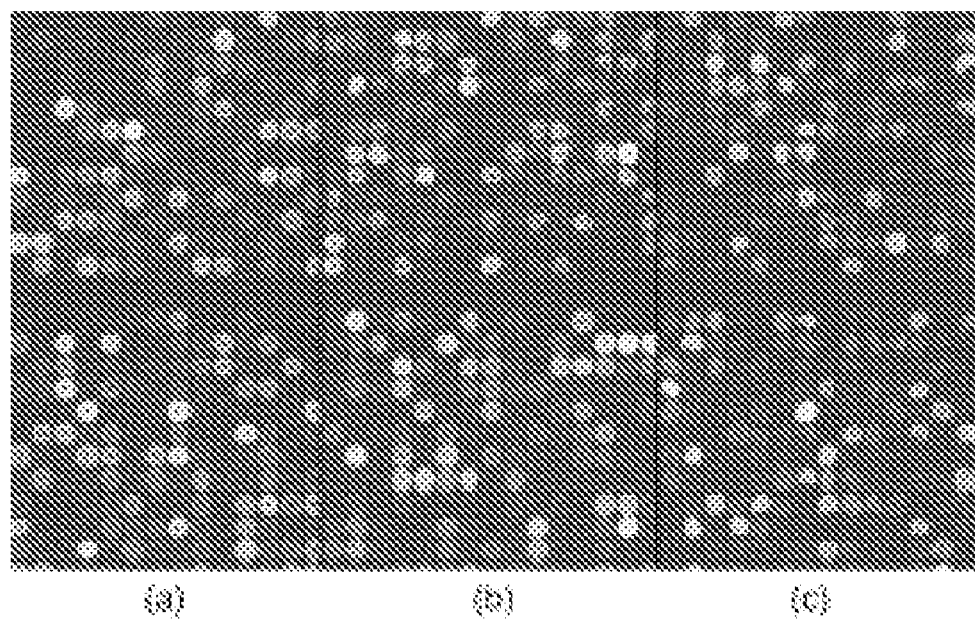
FIG. 8 illustrates chord rate settings and includes FIGS. 8(a), 8(b), and 8(c)

Once the number of chords for a spot is determined, the distance, L, of each chord center to the edge is selected from a beta distribution: L~B($\alpha_L$, $\beta_L$). Inter-block variability is modeled by allowing $\alpha_L$ and $\beta_L$ to be randomly selected from uniform distributions: $\alpha_L$~U($a_\alpha$, $b_\alpha$), and $\beta_L$~U($a_\beta$, $b_\beta$). Owing to the large family of shapes generated by beta distributions, this provides a wide range of distributions for L. Finally, the chord locations are chosen uniformly randomly according to an angle $\theta$~U(0, 2$\pi$). FIG. 8 illustrates the effect of selecting increased chord rates. FIG. 8 shows different chord rate settings for each of the slides. The probability weights for (0,1,2,3,4) chords were set at the following levels: FIG. 8(*a*) $p_0$=0.70, $p_1$=0.30; $p_2$=0; $p_3$=0; $p_4$=0; FIG. 8(*b*) $p_0$=0.20, $p_1$=0.40, $p_2$=0.25; $p_3$=0.15; $p_4$=0; FIG. 8(*c*) $p_0$=0, $p_1$=0.10, $p_2$=0.40, $p_3$0.30, $p_4$=0.20. The chord rate is reset at the beginning of a block.

2.2.5. Edge Noise

Owing to the manner in which liquid dries, the spots usually do not have smooth edges. To provide a realistic visual effect, as well as to pose a challenge if edge detection procedures are under consideration, this irregular edge effect is simulated via parameterized noise using a binary edge-noise procedure employed in digital document processing [25]. After determining the target shape by cutting the center hole, removing possible chords, and possibly creating drift, and prior to simulating the signal intensity, the spot is still in its binary format, and thus the binary edge-noise procedure can be applied directly. Edge noise is applied to both the outer perimeter of the spot and the inner perimeter containing the hole.

Figure 9:
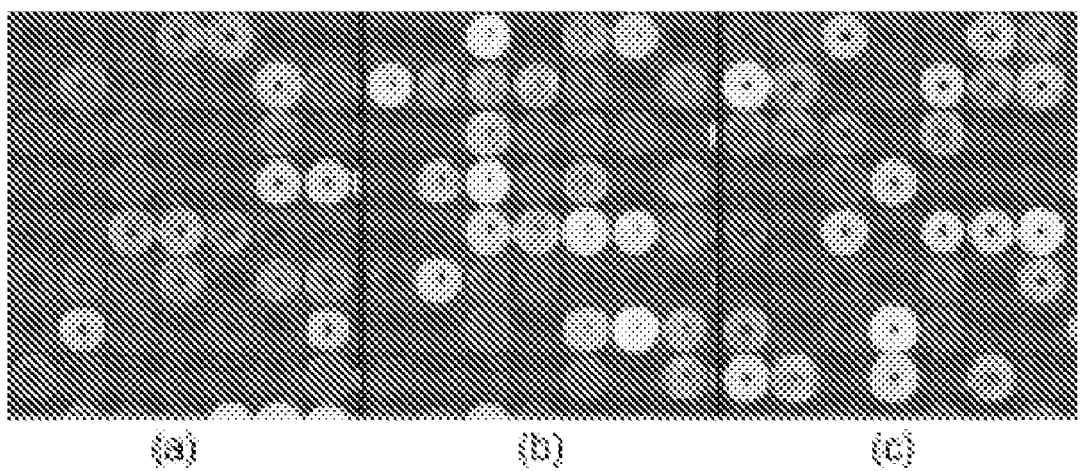
FIG. 9 illustrates an edge noise of spots and includes FIGS. 9(a), 9(b), and 9(c)

The procedure begins by first generating a white noise image having range [0, max intensity]. A 3×3 averaging filter is applied to the white-noise image to arrive at a noise image N that possesses a degree of correlation resembling the noise characteristics of various physical processes, including printing processes. The edge of a binary image can be considered to consist of two parts, and inner and outer borders. In our case, the spot radius is known and so are these borders. The inner border is formed by morphologically eroding the image by a 3×3 structuring element and then subtracting the erosion from the original image. The outer border is formed by morphologically dilating the image by a 3×3 structuring element and then subtracting the original image from the dilation. To apply noise to the inner border, a threshold, mid+δ, just above midpoint is applied to N, this binary image is ANDed with the inner border of the original binary spot S, and the result is XORed with S. Noise is applied to the outer border by thresholding N just below the midpoint (mid−δ), complementing, and then ANDing with the outer border of S. This noisy outer border is then ORed with the image possessing inner border noise to yield the edge-degraded binary spot S'. The process is mathematically described by $$S' = ((N_{mid+\delta} \cap S_{in}) \Delta S) \cup ((N_{mid-\delta})^c \cap S_{out}) \quad (1)$$

where δ controls the threshold and hence the edge noise, and Δ denotes the symmetric difference. δ is used as controlling parameter. S' is a binary mask giving the spatial domain of the spot. FIG. 9 shows edge noise for various δ thresholds. FIG. 9 shows the edge noise on the spots. A noise controlling parameter (δ) can be set from [0, 1.01]. The examples of FIG. 9 show an increased edge noise effect. For FIG. 9(a), δ=0.25. For FIG. 9(b), δ=0.1. For FIG. 9(c), δ=0.03.

2.2.6. Signal Intensity

Simulation of signal intensity is divided into three steps. First, it is assumed that the fluor-tagged mRNAs co-hybridized to a single slide are from the same cell type, and therefore the signals from the two fluorescent channels are supposed to be identical, with some variation. Second, some percentage of genes may be selected as significantly over- or under-expressed. Third, foreground noise is added to the entire array to simulate the normal scanning integration process.

It is well known that the distribution of gene expression levels within a cell closely follows an exponential distribution [13]. Given a microarray containing N genes, the intensity levels $I_k$, for $k=1, \ldots, N$, assumed to be related to the expression levels of N genes, are simulated by an exponential distribution. This intensity level $I_k$ is considered to be the ground-truth signal that is not directly measurable from microarray, since from either biological or bio-chemical processes, from mRNA extraction up to the hybridization process, some variation will be introduced into measurement of final fluorescent signal strength. For each microarray, a particular exponential distribution with mean β is first chosen (for a detection system with gray-level up to 65,535, β is usually selected around 3000). Then at each spot location, which is assumed to represent one unique gene, one ground-truth signal level $I_k$ is generated from the exponential distribution. For two observable measurements ($R_k$, $G_k$) from two fluorescent channels, two numbers are generated from a normal distribution with mean of $I_k$ and standard deviation of $\alpha I_k$, where α is a pre-determined coefficient of variation, which is usually about 5% to 30% depending on the assumed biological relation between the two channels.

To include outlier expression levels that reflect certain realistic conditions [3-10,14], one may select 5% to 10% of the spots to be either over- or under-expressed. This condition is achieved by selecting the genes from the entire microarray based on a probability, $p_{outlier}$ (e.g., $p_{outlier}=0.05$ for 5% outliers), and then selecting the targeted expression ratio for the kth gene, $$t_k = 10^{+b_k} \quad (2)$$

where $b_k$ satisfies a beta distribution, $b_k \sim B(1.7, 4.8)$, and where the +/− sign is selected with equal probability. Upon obtaining a targeted expression ratio, the procedure converts the expression intensities from the two fluorescence channels by $$R'_k = R_k \sqrt{t_k} \quad (3)$$
$$G'_k = \frac{G_k}{\sqrt{t_k}}$$

where $R_k'$ and $G_k'$ denote the signal values after the conversion.

Upon obtaining the signal intensities for each spot, ($R'_k$, $G'_k$), each pixel within the spot binary mask derived from steps 2.2.1 to 2.2.5 is filled with the signal intensity. Normally distributed foreground noise is then added pixel-wise. This yields, at each pixel, the intensities $SR = R_k' + I_{f1}$, and $SG = G_k' + I_{f2}$, where $I_{f1} \sim N(\mu_{R_k}, \sigma_R^2)$, $I_{f2} \sim N(\mu_{G_k}, \sigma_G^2)$ and $\mu_{R_k} \sim R_k' \times U[f_{a_1}]_{,[b_1]}$, $\sigma_{R_k} \sim \mu_{R_k} \times U[f_{c_1}, f_{d_1}]$, $\mu_{G_k} \sim G_k' \times U[f_{a_2}, f_{b_2}]$, and $\sigma_{G_k} \sim \mu_{G_k} \times U[f_{c_2}, f_{d_2}]$. In the remainder of the document, α's are used as appropriate: $\alpha_{m_1} \sim U[f_{a_1}, f_{b_1}]$, $\alpha_{m_2} \sim U[f_{a_2}, f_{b_2}]$, $\alpha_{s_1} \sim U[f_{c_1}, f_{d_1}]$, and $\alpha_{s_2} \sim U[f_{c_2}, f_{d_2}]$.

Figure 10:
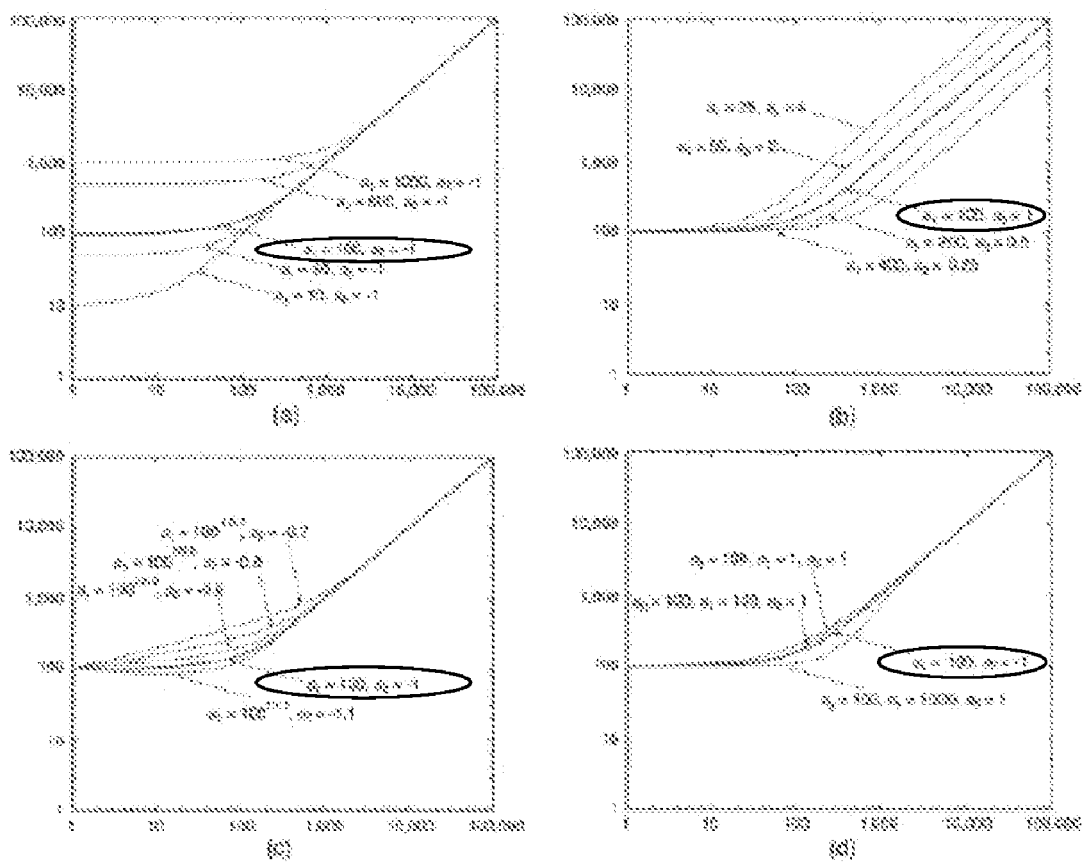
FIG. 10 illustrates fluorescent detection response characteristic functions and includes FIGS. 10(a), 10(b), 10(c), and 10(d)

Owing to various reasons, such as imprecise quantities of starting mRNA for the two channels, different labeling efficiencies, or uneven laser powers at the scanning stage, in actual microarray experiments there may not be equal intensities even if two channels use exactly the same labeled mRNA. Moreover, one may not be able to assume that the fluorescent intensity is linearly related to the expression level. In fact, it is very difficult to determine the exact form of the response function from expression level to intensity due to the complex combination of bio-chemistry to photon-electronics. A family of functions that covers most of the understandable conditions, shown in FIG. 10, such as delayed response, saturation (which is an embedded feature in the digital system since in general no gray-level can pass 16-bit binary digits in a typical microarray system), and unbalanced channel intensity, is selected. FIG. 10 shows fluorescent detection response characteristic functions. In the figures, the middle (circled) curve is the reference function with the parameters of ($a_0$, $a_1$, $a_2$, $a_3$)=(0, 100, −1, 1). Also, in all the figures, the x-axis is the input signal intensity, and y-axis is the observed signal intensity, and both are in $\log_{10}$-scale. FIG. 10(a) shows delayed response at various levels, with fixed $a_0=0$ and $a_3 1$. FIG. 10(b) shows different amplification levels, with fixed $a_0=0$ and $a_2=1$. FIG. 10(c) shows different response curvature, with fixed $a_0=0$ and $a_3=1$. FIG. 10(d) shows some other parameter settings, with fixed $a_3=1$. This simulation is intended to facilitate understanding as to what is the best way for expression ratio normalization, whether linear based methods will be sufficient or non-linear based methods may be needed. The function family is characterized by four parameters, ($a_0$, $a_1$, $a_2$, $a_3$), and the function form is given by $$f(x) = a_3[a_0 + x(1 - e^{-x/a_1})^{a_2}]; \quad a_3 > 1 \quad (4)$$

Having chosen a function from the family, the expression levels, R' and G', from each fluorescent detection channel are then transformed by the detection system response characteristic function defined by $f_R(x)$ or $f_G(x)$ to obtain the realistic fluorescent intensity observed. The observed fluorescent intensities are $$R_k'' = f_R(R_k')$$

$$G_k'' = f_G(G_k') \quad (5)$$

where $f_R$ or $f_G$ may take different parameters for each fluor-tagging system. The simulation performs the following steps for signal placement to emulate the real process affecting the signal spots:

1. Generate ground truth expression signal $I_k$ (k=1, ..., N) for every gene by exponential distribution. (See Section 2.2.6.)
2. Let $R_k = G_k = I_k$. If a self-self experiment is to be simulated, skip steps 3 and 4.
3. If an experiment with two different samples is simulated, some outlier genes are selected and then their intensities are altered. (R', G') is obtained from (R, G) for the genes (e.g., all the genes or some subset thereof). (See Section 2.2.6, and Equations 2, 3.)
4. If a fluorescent system with imperfect response characteristics is simulated, the intensities are further converted by $R'' = f_R(R')$ and $G'' = f_G(G')$. (See Section 2.2.7.)
5. The actual simulated fluorescent intensities for both channels are obtained by applying additional variation via a Normal distribution function $SR = R'' + N(\mu_R, \sigma_R^2)$, where $\mu_R = \alpha_{m1} R''$, $\sigma_R^2 = \alpha_{s1} \mu_R$, and similarly for signal G. (See Section 2.2.6)

Figure 11:
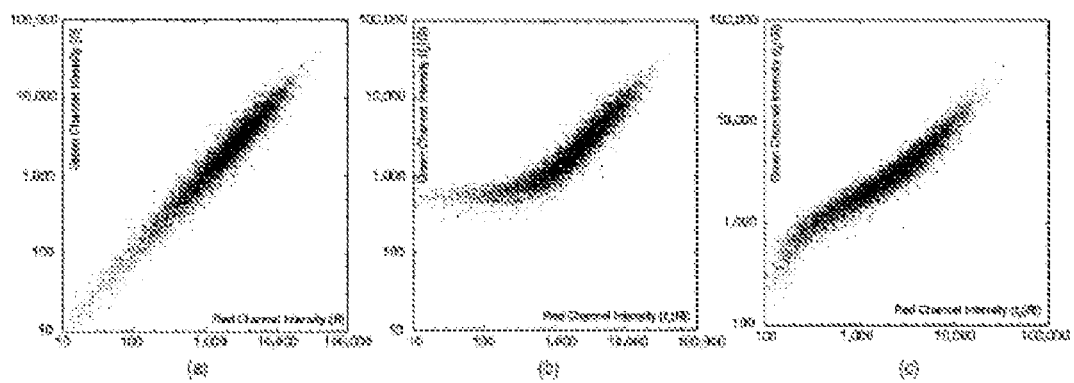
FIG. 11 illustrates possible scatter plots due to various response conversions for different fluorescent channels and includes FIGS. 11(a), 11(b), and 11(c)

The scatter plots in FIG. 11 show the effects of the channel normalization. By choosing different parameter sets, one can simulate many of the situations observed in real microarray images. FIG. 11 shows possible scatter plot due to various response conversions for different fluorescent channels. 10,000 data points (gene expression levels) were generated by the exponential distribution with mean of 3000. After passing through two fluorescent channels (with some response characteristic functions as shown in FIGS. 11(a) to 11(c)), data variations were added by passing each data point through a normal distribution with the standard deviation to be 15% of mean expression signal. FIG. 11(a) shows without any alteration (or equivalently, set parameters for the response function to be ($a_0, a_1, a_2, a_3$=(0, 1, -1, 1)), and assume the signal intensities from red channel and green channel are equivalent (a simulated self-self experiment). FIG. 11(b) shows a banana shape. Intensity in the green channel pass a response function with parameters ($a_0, a_1, a_2, a_3$=(0, 500, -1, 1), where the red channel takes the parameters (0. 10, -1, 1). FIG. 11(c) shows a sinusoid shape. The red channel's response function with parameters (0, $100^{1/0.7}$, -0.7, 1) and the green channel with (0, $100^{1/0.9}$, -0.91).

2.2.8. Edge Enhancement

Under some fabrication conditions, such as incorrect humidity control, where the cDNA solution tends to accumulate towards the outer edge during the drying process, the spot edge may appear brighter than the rest of the spot. This phenomenon is modeled by randomly enhancing the edge. The number, $N_e$, of pixels from the edge to be enhanced is fixed. The enhancement, $W_{ed}$, is added to the original intensity. $W_{ed}$ satisfies a normal distribution, $W_{ed} \sim N(\mu_e, 1)$. Randomness between blocks is modeled by making $\mu_e$ uniformly distributed, $\mu_e \sim U(l_a, l_b)$.

2.3. Post-Processing Simulation

Most post-processing steps simulate handling and scanning artifacts: scratch noise resulting from improper handling of microarray slides, spike noise arising from the impurity of mRNA extraction steps or perhaps insufficient washing conditions, snake noise due to the accumulation of dust if the slides have sat in open space too long, and last, but not least, smoothing resulting from many scanners' averaging effects or integration processes. For the most part, these steps model the interaction between signal and noise in the spatial domain, which causes pixel-wise non-linear degradation. It is expected that the microarray image analysis software shall be able to handle most of the noise conditions outlined here in order to measure the signal precisely.

2.3.1 Spike Noise

Figure 12:
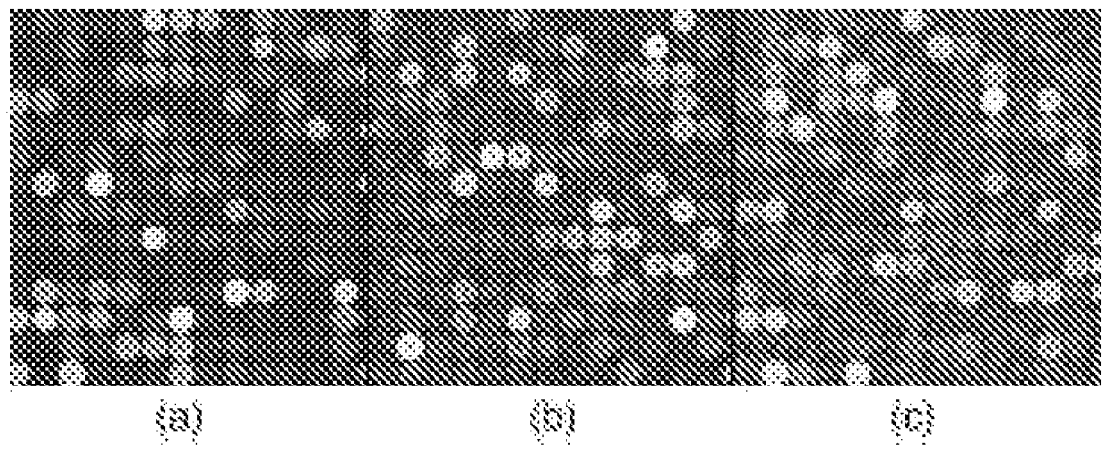
FIG. 12 illustrates increased spike noise levels and includes FIGS. 12(a), 12(b), and 12(c)

In a practical biology laboratory, it is not necessary to maintain a dust-free environment. Hence, fine microscopic dust particles are nearly impossible to avoid. On laser excitation, these particles fluoresce to give high intensity spikes. Moreover, in some cases, bad mixtures of cDNA solutions result in precipitation, and these particles fluoresce with a very high intensity. These effects are simulated by adding spike noise at a preset rate. Such intensity spikes are added randomly across the entire slide area, the number of such noise pixels being preset in terms of the total number of pixels in the array. The amount of spike noise in an array is set with reference to the percentage, $L_{spi}$, of the total number of pixels in the array. Typical low to high noise levels are be set by selecting 0.1% to 10%. Once a pixel is selected for spike noise, the adjacent pixels have a higher probability of being affected. Thus, a random number, $W_{spi}$ of pixels are chosen in an arbitrary direction to be influenced by this noise. The intensity, $N_S$, of the spike noise is governed by an exponential distribution with mean $\mu_{spi}$. In FIG. 12, the exponential mean is fixed but the spike rate is increased through the parts of the figure. FIG. 12 shows increased spike noise levels $L_{spi}$. FIG. 12(a) shows a level of 0.1%. FIG. 12(b) shows a level of 5%. FIG. 12(c) shows a level of 10%. An exponential rate range is maintained for the above.

2.3.2 Scratch Noise

Figure 13:
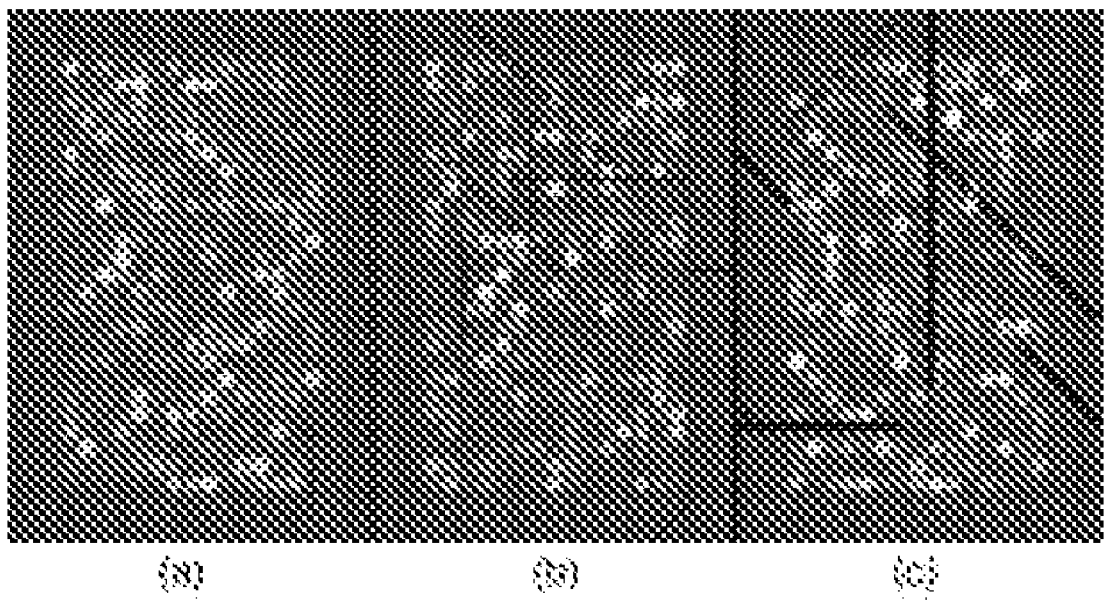
FIG. 13 illustrates scratch noise and parameter settings and includes FIGS. 13(a), 13(b), and 13(c)

Physical handling of the array slides can result in surface scratches. These typically result in low intensity levels. Scratch-noise intensity is parameterized as a ratio, $\kappa_{sc}$, giving the background-to-scratch-noise intensity level. Other parameters are the number of strips, strip thickness $W_{sc}$ and a random strip length, $L_{sc}$ given as a multiple of the spot size. The latter is modeled as a uniform distribution: $L_{sc} \sim [L_{sc1}, L_{sc2}]$. Strips are placed at random positions on the array, and are inclined according to a (discrete) uniformly random angle, $\theta_{sc} \in \{0°, 45°, 90°, 135°, 180°\}$. FIG. 13 shows scratch noise with its parameter settings; the number of strips is fixed at 7. FIG. 13 shows the noise for incremental parameter settings: FIG. 13(a) shows $L_{sc} \sim U[2\ 7]$, $\kappa_{sc} = 1.5$, $W_{sc} = 3$ pixels; FIG. 13(b) shows $L_{sc} \sim U[5\ 15]$, $\kappa_{sc} = 2.5$, $W_{sc} = 7$ pixels; FIG. 13(c) shows $L_{sc} \sim U[8\ 45]$, $\kappa_{sc} = 4.0$, $W_{sc} = 15$ pixels. The number of scratches is maintained to 7. The noise factor $\kappa_{sc}$, =0.1.

2.3.3 Snake Noise

Figure 14:
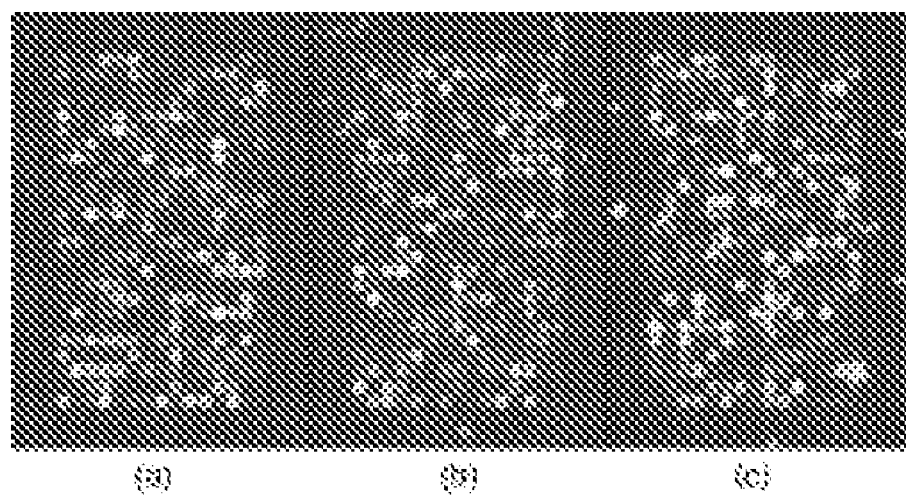
FIG. 14 illustrates parameter settings for snake noise and includes FIGS. 14(a), 14(b), and 14(c)

Fine fabric dust particles on the slides can create snake-tailed strips on laser excitation. These strips are normally higher intensity than the signal level. To simulate this noise, an equiprobable multi-directional snake noise has been generated consisting of some number, $N_{seg}$, of segments. Analogously to scratch noise, the intensity parameterized as a ratio, $\kappa_{sn}$, giving the average-signal-to-snake-noise intensity level, the number of snakes, snake thickness $W_{sn}$, and a random length, $L_{sn}$, given as a multiple of the spot size. The latter is modeled as a uniform distribution: $L_{sn} \sim U[L_{sn1}, L_{sn2}]$. FIG. 14 shows different parameter settings for snake noise. FIG. 14 shows the noise for incremental parameter settings: FIG. 14(a) shows $N_{seg}=5$, $L_{sn} \sim U[5, 10]$, $\kappa_{sn}=0.50$, $W_{sn}=2$ pixels; FIG. 14(b) shows $N_{seg}=10$, $L_{sn} \sim U[5, 30]$, $\kappa_{sn}=0.33$, $W_{sn}=3$ pixels; FIG. 14(c) shows $N_{seg}=15$, $L_{sn} \sim U[5, 80]$, $\kappa_{sn}=0.25$, $W_{sn}=5$ pixels. The direction of the tail was randomly chosen with equal probability for each.

2.3.4 Smoothing Function

Figures 15, 16:
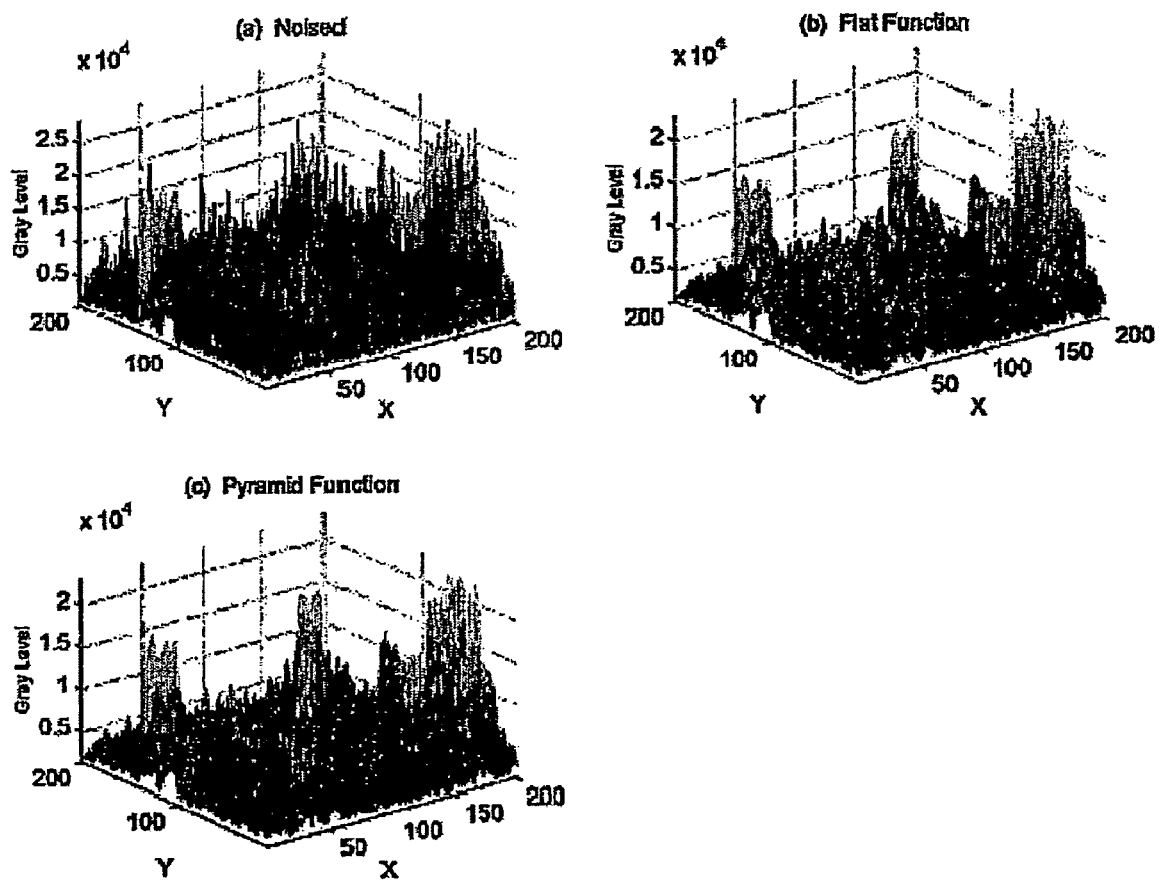
FIG. 15 illustrates convolution kernels and includes FIGS. 15(a) and 15(b)
FIG. 16 illustrates a three-dimensional profile before and after smoothing and includes FIGS. 16(a), 16(b), and 16(c)

Addition of various noise types makes the microarray highly peaked with high pixel differences. This stark irregularity can be mitigated by smoothing the image with either a flat or pyramidal convolution kernel. The kernels are shown in FIG. 15. The effect of smoothing is illustrated in FIG. 16, where the 3D profile of an originally noised image is shown, along with versions smoothed by flat and pyramidal kernels. Either smoothing kernel can be chosen.

2.4. Image Generation and Parameter I/O

Parameters governing the effects described in the preceding sections form the input (through a file) to the synthetic array software. These include parameters for array dimensions, shape parameters, and noise processes. Relevant information, such as spot size, position, various drifts (center hole, spot), noise processes, (foreground, spike, snake, scratch, etc), and chord rate, are recorded for every spot printed on the synthetic array. Block controlling parameters and the array information are also recorded. The recorded information contains the true signal for the synthetic microarray. This can be used subsequently to analyze various signal processing tools.

TIFF (tagged image file format) format is widely used due to platform independence and flexibility of data representation. The synthetic images are generated in TIFF with sample (pixel) resolution of two bytes for every color (R, G). Both monochrome and color images with interlaced channel information (R, G, with dummy B) are generated. Standard freeware routines (http://www.libtiff.org) are used to generate these formats. The image file is written in blocks, where the size of the block (commonly called "strip") is set equal to the image width. The image data is written in the native order (big-endian, little-endian) of the host CPU on which the library is compiled. Image data quality is maintained by disabling compression and other special options available in these routines and formats.

2.5. Summary of Model Parameters

The cDNA microarray printing process can be categorized and grouped into independent events. Each event is probabilistically described by assigning a distribution, as previously described. Due to the physical nature of the process, there exist variations between events. This variation is described by randomization of the controlling parameters (second level randomization). The parameter randomization can be broadly grouped as (i) randomization at spot level, (ii) randomization at block level, (iii) randomization at array level. The parameters are grouped and mathematically described in TABLE 1.

TABLE 1

Parameter settings for the cDNA microarray simulation

| Level | Simulation | Parameter Descriptions | Distribution |
|---|---|---|---|
| SPOT | Spot Size | S: Spot radius with $(\mu_s, \sigma_s^2)$ | $S \sim N(\mu_s, \sigma_s^2)$ |
| | Spot Drift | $\delta_x, \delta_y$: Drifting Level | $\delta_x, \delta_y \sim U(d_a, d_b)$ |
| | | $d_a, d_b$: Percentage of spot radius | |
| | | $P_D$: Drift activation probability | $D_x = \delta_x \times S \times U[-1, 1]$ |
| | | $D_x, D_y$: Relative drifting | $D_y = \delta_y \times S \times U[-1, 1]$ |
| | | $(X'_1, Y'_1)$: Drifted center coordinates $(X'_2, Y'_2)$: Second channel, where (X, Y) is predefined spot center coordinates | $\begin{cases} X'_1 = X + D_x \\ Y'_1 = Y + D_y \end{cases}$ |
| | | | $\begin{cases} X'_2 = X'_1 + U[-1, 1] \\ Y'_2 = Y'_2 + U[-1, 1] \end{cases}$ |
| | Inner Hole Size | H, V: Horizontal and vertical axis of the inner elliptical hole | $H \sim N(\mu_H, \sigma_H)$ $V \sim N(\mu_V, \sigma_V)$ |
| | Inner Hole Drift | $X_C, Y_C$: Ideal spot center | $X_R = X_C + \delta c_{xR}$ |
| | | $X_R, Y_R$: First channel coordinates | $Y_R = Y_C + \delta c_{yR}$ |
| | | $X_G, Y_G$: Second channel coordinates where | $X_G = X_C + \delta c_{xG}$ |
| | | $\delta c_{xG}, \delta c_{yG}, \delta c_{xR}, \delta c_{yR}$: drift level set a the block level | $Y_G = Y_C + \delta c_{yG}$ |
| | Chord Removal | $P_{N_c}$: Chord removal probability | $P_{N_c} = \{p_0, p_1, p_2, p_3, p_4\}$, where |
| | | $\{p_k$: probability of k chords to be removed from a target spot$\}$ | $p_0 + p_1 + p_2 + p_3 + p_4 = 1$ $N_c \sim \{0, 1, 2, 3, 4\}$ |
| | | L: Chord length | $L \sim B(\alpha_L, \beta_L)$ |
| | | $\theta$: Chord position | $\theta \sim U(0, 2\pi)$ |
| | Spot Intensity | $\beta$: Mean intensity for the assumed cell system. | $I_k \sim Exp(\beta)$ |
| | | $R_k, G_k$: $k^{th}$ spot (fixed) signal intensities for both channels | $R_k \sim N(I_k, \sigma_I)$ $G_k \sim N(I_k, \sigma_I)$ |
| | | $\alpha$: Coefficient of variation of signal intensity in the system | $\sigma_I = \alpha \times I_k$ |

TABLE 1-continued

Parameter settings for the cDNA microarray simulation

| Level | Simulation | Parameter Descriptions | Distribution |
|---|---|---|---|
| | Outlier's Intensity | $p_{outlier}$: Outlier activation probability<br>$b_k$: Outlier control level | Equal probability at 0.05 to 0.10<br>$b_k \sim$ Beta (1.7, 4.8) |
| | | $t_k$: Targeted outlier expression ratio, with equal-probability of +/− sign. | $t_k = 10^{\pm b_k}$ |
| | | $R'_k, G'_k$: $k^{th}$ outlier signal intensities for both channels | $R'_k = R_k \times \sqrt{t_k}$<br>$G'_k = G_k / \sqrt{t_k}$ |
| | Channel Conditioning | $R''_k, G''_k$: Pre-normalized signal intensity of the spots on red, green channels | $R''_k = f_1(R'_k)$<br>$G''_k = f_2(G'_k)$ |
| | | $a_0, a_1, a_2,$ and $a_3$, parameters for response characteristic function. | $f(x) = [a_0 + x(1 - e^{-x/a_1})^{a_2}]a_3$;<br>where $a_3 > 1$ |
| | Spot Signal Variation - foreground noise | $SR_k, SG_k$: Pixel-wise (x, y) signal intensity | $SR_k(x, y) \sim R''_k + N(\mu_{R''_k}, \sigma_R^2)$<br>$SG_k(x, y) \sim G''_k + N(\mu_{G''_k}, \sigma_G^2)$ |
| | | $\alpha_s$: Within spot signal coefficient of variation. | $\begin{cases} \mu_{R''_k} = R''_k \times \alpha_{m_1}; \alpha_{m_1} \sim U[f_{a_1}, f_{b_1}] \\ \mu_{G''_k} = G''_k \times \alpha_{m_2}; \alpha_{m_2} \sim U[f_{a_2}, f_{b_2}] \end{cases}$<br>$\begin{cases} \sigma_R = \alpha_{s_1} \times \mu_{R''_k}; \alpha_{s_1} \sim U[f_{c_1}, f_{d_1}] \\ \sigma_G = \alpha_{s_2} \times \mu_{G''_k}; \alpha_{s_2} \sim U[f_{c_2}, f_{d_2}] \end{cases}$ |
| | Edge Enhancement | $W_{ed}$: Level of enhancement, parameter ($\mu_e$) set for the block<br>$N_e$: Number of pixels enhanced | $W_{ed} \sim N(\mu_e, 1)$ |
| | Edge Noise | Apply edge noise at the set level ($\delta_{ed}$) | |
| BLOCK | Radius Parameters | $\mu_s, k_s$: mean and radius deviation factor<br>$s_a, s_b$: bounds of radius, set by block size and inter spot gap | $\mu_r \sim U(s_a, s_b)$<br>$\sigma_s \sim k_s \times \mu_s$ |
| | Chord Parameters | $N_c$: Chord rate picked with equal probability<br>$\alpha_L, \beta_L$: Chord distributional parameters | $N_c \in U\{0, 1, 2, 3, 4\}$ having weights $\{p_0, p_1, p_2, p_3, p_4\}$<br>$\alpha_L \sim U(a_\alpha, b_\alpha), \beta_L \sim U(a_\beta, b_\beta)$ |
| | Inner Hole Parameters | $\mu_H, \mu_V, \sigma_H, \sigma_V$: Parameters for inner elliptical hole<br>$\mu_R$: Mean spot radius in the block | $\mu_H \sim U(L_a, L_b) \times \mu_R,$<br>$\mu_V \sim U(L_a, L_b) \times \mu_R$<br>$\sigma_H = \alpha_1 \times \mu_R, \sigma_V = \alpha_2 \times \mu_R$<br>$\alpha_1 \sim U(P_a, P_b), \alpha_1 \sim U(P_a, P_b)$ |
| | Drift Parameters | $\delta c_{xG}, \delta c_{yG}, \delta c_{xR}, \delta c_{yR}$: drift level<br>i, j: Percentage of the spot radius | $\delta c \sim U[i, j]$<br>$\delta c_{xG} = \delta c \times U[-1, 1],$<br>$\delta c_{yG} = \delta c \times U[-1, 1]$<br>$\delta c_{xR} = \delta c_{xG} + U[-1, 1], \delta c_{yR} = \delta c_{yG} + U[-1, 1]$ |
| | Enhancement | $l_a, l_b$: Range of intensity ratio. Set mean level of enhancement for a block | $\mu_e \sim U(l_a, l_b)$ |
| ARRAY | Physical Dimensions | $B_w, B_h$: Block Size - width, height (distance between first spot centers of any two block)<br>$M_l, M_r, M_t, M_b$: Margin Settings (left, right, top, bottom)<br>$N_{pin}, N_{row}$: Number of pins in an array, printed equally across $N_{row}$ number of rows<br>$NS_w, NS_h$: Number of Spots along the width ($NS_w$) and height ($NS_h$) of the block | Typical Setting for a 8 blocks, 2 row array (in pixels):<br>$B_h, B_w = 900$<br>$M_l, M_r, M_t, M_b = 100$ |

TABLE 1-continued

Parameter settings for the cDNA microarray simulation

| Level | Simulation | Parameter Descriptions | Distribution |
|---|---|---|---|
| | Signal to Noise Ratio Interspot Distance | SNR: Signal to noise level is set for an array<br>$G_{sp}$: Interspot distance, set for an array | |
| | Background | $I_{b\_ch1}$, $I_{b\_ch2}$: Background intensity, with parameters set for an array. | $I_{b\_ch1} \sim N(\mu_b, \sigma_{b_1}^2)$<br>$I_{b\_ch2} \sim N(\mu_b, \sigma_{b_2}^2)$ |
| | | $\gamma$: Background level<br>Parameter settings:<br>Flat fluorescent background | $\gamma \sim U[a, b]$<br>$\mu_b = \gamma$, |
| | | Functional background $g(x, y)$: choice of parabolic, positive or negative slant surface function | $\mu_b = \gamma \times g(x, y)$,<br>with,<br>$\sigma_{b_1} = (k_{b_1}\mu_b)$, $\sigma_{b_2} = (k_{b_2}\mu_b)$ |
| | Spike Noise | $L_{spi}$: Level of spike noise (set in terms of percentage of total pixels)<br>$N_s$: Intensity of the Spike noise<br>$\mu_{spi}$: Noise rate<br>$W_{spi}$: Width of the noise cluster | $N_s \sim Exp(\mu_{spi})$,<br>$\mu_{spi} \sim U[e, f]$<br>$W_{spi} \sim U[g, h]$ |
| | Edge Noise | $\delta_{ed}$: Set the controlling parater | $\delta_{ed}$ set as a percentage of maximum intensity value |
| | Snake Noise | $N_{seg}$: Number of snake tails in an image<br>$I_{sn}$: Intensity of the noise tail<br>$\kappa_{sn}$: Average signal-to-snake-noise intensity level<br>$L_{sn}$: Length of the segment expressed as multiples of average spot size<br>$W_{sn}$: Width of the snake noise tail | $N_{seg}, \kappa_{sn}, L_{sn}, W_{sn}$<br>$I_{sn} \sim N(\mu_{sn}, \sigma_{sn})$<br>$\mu_{sn} = (I_k/\kappa_{sn})$, $\sigma_{sn} = k_{sn} \times \mu_{sn}$<br>$L_{sn} \sim U[L_{sn1}, L_{sn2}]$ |
| | Scratch Noise | $N_{sc}$: Number of scratch tails in an image<br>$I_{sc}$: Intensity of the scratch noise<br>$\kappa_{sc}$: Average background-to-scratch-noise intensity level<br>$L_{sc}$: Length of the segment in units of average size of the spots<br>$W_{sc}$: Width of the scratch noise<br>$\theta$: Scratch noise inclination | $N_{sc}, \kappa_{sc}, W_{sc}, \theta$<br>$I_{sc} \sim N(\mu_{sc}, \sigma_{sc})$<br>$\mu_{sc} = (\mu_b/\kappa_{sc})$, $\sigma_{sc} = k_{sc} \times \mu_{sc}$<br>$L_{sc} \sim U[L_{sc1}, L_{sc2}]$<br>$\theta \in U \{0, 45, 90, 135, 180\}$ ° |

Each noise type is categorized into one of the three groups and individually parameterized. Some are related to another noise parameter; others are independent. Each noise parameter is assigned a statistical distribution fitting its nature. For instance, consider spot radius. Spot Level obeys a normal distribution ($\mu_s$, $\sigma_s^2$), where the mean spot radius ($\mu_s$) is randomly picked over a small range ($s_a$, $s_b$) at the Block Level. This spot size range is set for an array depending on a user setting: the number of spots in a block ($NS_w$, $NS_h$) at the Array Level. If a noise type needs to be suppressed, then the corresponding parameters can be set small to nullify its effect. For example, Inner Spot Hole follows a normal distribution along its vertical ($\mu_H$, $\sigma_H$) and horizontal ($\mu_V$, $\sigma_V$) axes. Its parameters are randomly picked from a preset range ($L_a$, $L_b$) and related to the mean spot radius ($\mu_R$) at the Block Level [$\mu_H \sim U(L_a, L_b) \times \mu_R$, $\mu_V \sim U(L_a, L_b) \times \mu_R$]. For small or negligible doughnut holes, this preset range can be set small, or even null for perfect spots. The table is perused from spot level to the array level, tagging through the corresponding parameters, as indicated in the above examples.

3. Examples of Simulated Microarrays and Image Analysis

The described process and noise effects are controlled by appropriate parameter selection. Depending on the parameter setting the arrays can be roughly classified as ideal, average, or noisy. Given a good printing run (substantially no mechanical deposition problems), a relative matured hybridization protocol, and good RNA samples, along with a scanner of minimal optical warping, focusing and integration problems, a high-quality (ideal) microarray image is expected. The corresponding simulated ideal image will have a flat mean background with typical auto-fluorescence variation (<10% of mean background level, but no less than square-root of the mean background level), minimum spike/scratch/snake noise, little edge enhancement and substantially no channel conditioning problems. For average image quality, one would expect larger background variation and possibly a slanted mean level. There will also be more spike/scratch/snake noise interfering with signal spots. In a noisy setting, besides higher noise levels for various possible interference, one would also expect uneven background level (e.g. parabolic function), heavy spot deformity (chord cuts, edge enhancement, and large inner holes), and different channel conditioning (such as the banana shape in the intensity scatter plot shown in FIG. 11b).

FIG. 17 shows two microarrays generated with $NS_w$=35 rows and $NS_h$=25 columns, at $B_h$=$B_w$=900 pixels per block. The example shows full size arrays simulation with different parameter settings. Depending on the parameters the arrays are called as "average" and "noisy" in quality. FIG. 17(a) shows good quality, has SNR of 2.0, with normal background, and spike noise $L_{spi}$=0.3%. Array boundaries are set at $(M_t, M_l, M_r, M_b)$=(100, 100, 100, 100). By choosing parameters, two different array qualities have been generated. FIG. 17a illustrates an ideal microarray image with normal background and parameters β=3000, SNR =2.0, α=0.05, $G_{sp}$=6, $P_D$=0.05, $(d_a, d_b)$=(2, 15), $(k_{b_1}, k_{b_2})$ =(10, 10), $P_{outlier}$=0.05, $L_{spi}$=0.3%, $δ_{ed}$=0.3, $(f_{a_1}, f_{b_1}, f_{c_1}, f_{d_1})$=(2, 8, 2, 6)
$(f_{a_2}, f_{b_2}, f_{c_2}, f_{d_2})$=(2, 8, 2, 8)
$(a_0, a_1, a_2, a_3)$=(0, 1, −1, 1)
$(b_0, b_1, b_2, b_3)$=(0, 1, −1, 1)
$(l_a, l_b, N_e)$=(1, 3, 3)
$(p_0, p_1, p_2, p_3)$=(0.97, 0.03, 0, 0, 0)
$(K_{SN}, L_{SN1}, L_{SN1}, W_{SN}, N_{SN})$=(0.25, 10, 50, 1, 2)
$(K_{SC}, L_{SC1}, L_{SC2}, W_{SC}, N_{SC})$=(3, 5, 35, 3, 1)

FIG. 17(b) shows a noisy array with SNR of 1.1 with parabolic background noise, and spike noise $L_{spi}$=15%. FIG. 17(b) illustrates a noisy microarray image with parabolic background and parameters: β=3000, SNR=1.1, α=0.25, $G_{sp}$=4, $P_D$=0.4, $(d_a, d_b)$=(15, 100), $(k_{b_1}, k_{b_2})$=(25,2 5), $P_{outlier}$=0.7, $L_{spi}$=15, $δ_{ed}$=0.03, $(f_{a_1}, f_{b_1}, f_{c_1}, f_{d_1})$=(6, 12, 8, 20),
$(f_{a_2}, f_{b_2}, f_{c_2}, f_{d_2})$=(6, 12, 8, 20)
$(a_0, a_1, a_2, a_3)$=(0, 500, −1, 1)
$(b_0, b_1, b_2, b_3)$=(0, 10, −1, 1)
$(l_a, l_b, N_e)$=(10, 40, 3)
$(p_0, p_1, p_2, p_3)$=(0.05, 0.3, 0.25, 0.25, 0.15)
$(K_{SN}, L_{SN}, L_{SN}, W_{SN}, N_{SN})$=(0.25, 60, 110, 2, 10)
$(K_{SC}, L_{SC1}, L_{SC2}, W_{SC}, N_{SC})$=(0.25, 60, 110, 2, 10)

Figure 18:
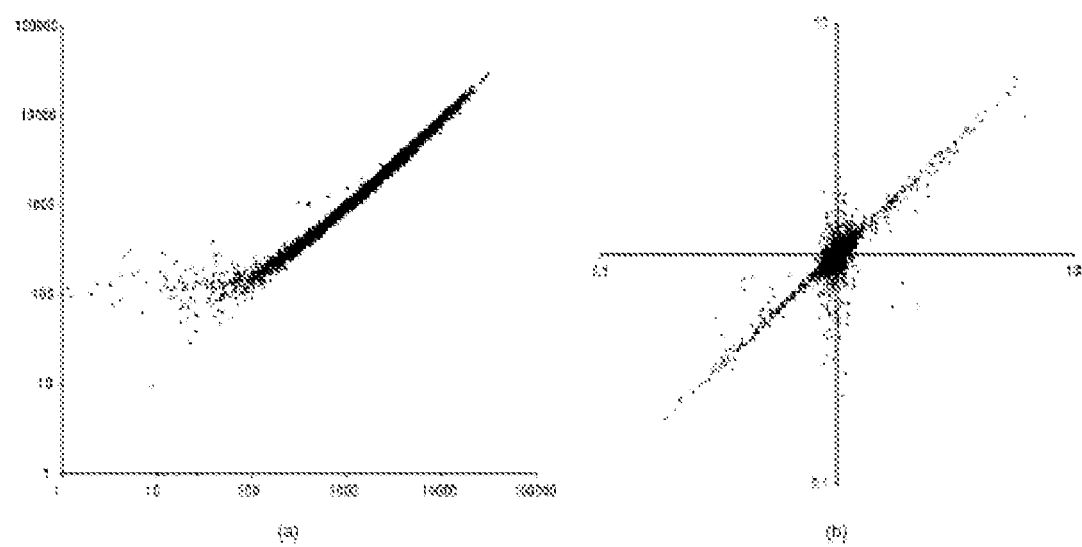
FIG. 18 illustrates a comparison between a simulated signal versus an extracted signal from a microarray image analysis program and includes FIGS. 18(a) and 18(b)

To illustrate how the simulation can be used to analyze microarray image software, the ArraySuite [11]software is applied to extract the image intensities and ratios from the image and then these are compared to the corresponding intensities and ratios used for simulation. The ideal case is used to illustrate the utility of the simulation. FIG. 18 shows a comparison between simulated signal (ideal setting) vs. extracted signal from a microarray image analysis program. In FIG. 18(a), intensities from one fluorescent channel have been extracted (y-axis) and plotted against the simulation signal intensities. FIG. 18(a), shows signal extracted from one fluorescent channel (y-axis) comparing to the signal used for simulation in the same channel (x-axis). The extracted signal generally corresponds well to the simulated signal, with some variation. After excluding intensities less than 300, the mean and standard deviation of the difference between the two $\log_{10}$-transformed intensities are 0.016 (or $10^{0.016}$=1.038) and 0.038 (or $10^{0.038}$=1.09), respectively. The ratio comparison is given in FIG. 18(b). FIG. 18(b) shows ratio from microarray image analysis program (y-axis) comparing to the ratios generated by the simulation (x-axis). When signal intensity is weak (less than 300), various noise components in the simulation process affect the accuracy of the signal extraction program. Since the problem may be unavoidable, a measurement quality metric may be used to provide confidence in downstream data analysis. In this case, if the signal intensity is less than 300, then the noise interaction is significant.

4. Conclusion

Modeling and simulation of microarray image formation is a key to benchmarking various signal processing tools being developed to estimate cDNA signal spots. Using a model to describe the signal ground truth not only helps in evaluating these tools, but also facilitates the understanding of various process interactions. To illustrate how the image-simulation program presented in this document can be used in the development of image-analysis software, an actual case is described.

Figure 19:
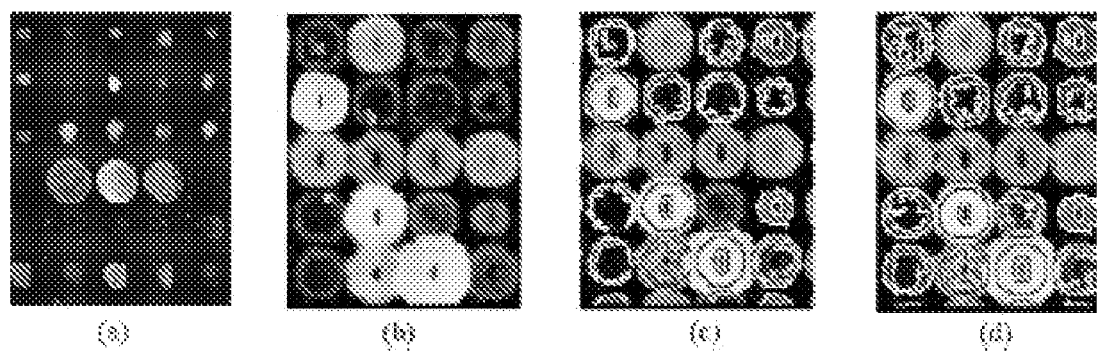
FIG. 19 illustrates simulated images exhibiting undesirable noise conditions and includes FIGS. 19(a), 19(b), 19(c), and 19(d).

The simulation program has been used extensively in the design of the microarray image-analysis program used at the National Human Genome Research Institute. This has been done by testing the accuracy of the analysis program on simulated images exhibiting troublesome noise conditions and then tuning the program to achieve better results. One such application concerns large and overlapping spots, as illustrated in FIG. 19(a), which shows part of an actual hybridized image in which some spots are substantially larger than intended owing to randomness in the cDNA deposition procedure. FIG. 19(a) shows part of an actual hybridized image with spots larger than average. This defect causes various problems, one being poor background estimation. This problem is illustrated by simulating an image with large spot size variation and drifting conditions [FIG. 19(b)]. FIG. 19(b) shows a simulated microarray with larger spots and spots overlapping with their neighbors. If the image analysis program extracts the local background by averaging the region around the bounding box (which was used as a starting condition in an earlier version of the NHGRI program), an elevated background average may be obtained since the bounding box may overlap neighboring targets that are large in size and strong in expression level. An additional problem is that some weak targets may not be detected [FIG. 19(c)]. FIG. 19(c) shows that an original background intensity extraction program produces an undetected spot (target in the middle without any outer boundary). Based on these considerations, the program has been modified to calculate the four average intensities from the four corners and the four average intensities from the four sides of the bounding box, and then take the minimum among these as the initial estimation of the local background. A histogram-based method is then invoked around the initial estimated background to further improve the estimation [11]. The output from FIG. 19(b) according to the modified program is shown in FIG. 19(d): the weak target is detected and there is improved local background estimation for the spots. FIG. 19(d) shows that the improved background extraction program more accurately measures the local background intensity and effectively allows detection of weak targets.

5. Alternatives

The various steps described herein can be achieved via execution of computer-executable instructions. Such instructions can be stored in computer-readable media (e.g., RAM, ROM, hard disk, CD-ROM, DVD-ROM, or the like).

Although exemplary embodiments of the invention and their advantages are described herein in detail, various alterations, additions, and omissions can be made without departing from the spirit and scope of the present invention as defined by the appended claims.

REFERENCES

The following are incorporated by reference:
1. Schena M, Shalon D, Davis R W, Brown P O, Quantitative monitoring of gene expression patterns with a complementary DNA microarray, 1995, *Science,* 270, pp 467-470.
2. DeRisi, J., Penland, L., Brown, P. O., Bittner, M. L., Meltzer, P. S., Ray, M., Chen, Y., Su, Y. A., and Trent, J.

M., Use of a cDNA microarray to analyze gene expression patterns in human cancer. *Nat Genet,* 1996. 14(4): pp. 457-60.
3. Spellman, P. T., et al., Comprehensive identification of cell cycle-regulated genes of the yeast *Saccharomyces cerevisiae* by microarray hybridization. *Mol Biol Cell,* 1998.9(12): p. 3273-97.
4. Khan, J., Simon, R et al., Gene expression profiling of alveolar rhabdomyosarcoma with cDNA microarrays. *Cancer Res,* 1998. 58(22): p. 5009-13.
5. Golub, T. R., Slonim, D. K., Tamayo, P., Huard, C., Gaasenbeek, M., Mesirov, J. P., Coller, H., Loh, M. L. Downing, J. R., Caligiuri, M. A., Bloomfield, C. D., and Lander, E. S., Molecular classification of cancer: class discovery and class prediction by gene expression monitoring. *Science,* 1999. 286(5439): p. 531-7.
6. Iyer, V. R., et al., The transcriptional program in the response of human fibroblasts to serum *Science,* 1999. 283(5398): p. 83-7.
7. Bittner, M., Meltzer, P. et al., Molecular classification of cutaneous malignant melanoma by gene expression profiling. *Nature,* 2000. 406(6795): p. 536-40.
8. Alizadeh, A. A., et al., Distinct types of diffuse large B-cell lymphoma identified by gene expression profiling. *Nature,* 2000. 403(6769): p. 503-11.
9. Hedenfalk, I., Duggan, D. Chen, Y., Radmacher, M. Bittner, M., Simon, R., Meltzer, P., Gusterson, B., Esteller, M., Raffeld, M., Yakhini, Y., Ben-Dor, A., Dougherty, E., Kononen, J., Bubendorf, L., Fehrle, W., Pittaluga, S., Gruvberger, S., Loman, N., Johannsson, O., Olsson, H., Wilfond, B., Sauter, G., Kallioniemi, O., Borg, A., and Trent, J., Gene-expression profiles in hereditary breast cancer. *N Engl J Med,* 2001. 344(8): p. 539-48
10. Khan, J., Wei, J. S., Ringnér, M., Saal, L. H., Ladanyi, M., Westermann, F. Berthold, F., Schwab, M., Antonescu, C. R., Peterson, C., Meltzer, P. S., Classification and diagnostic prediction of cancers using gene expression profiling and artificial neural networks. *Nat Med,* 2001. 7(6): p. 673-9.
11. Chen, Y., Dougherty, E. R., and M. Bittner, Ratio-based decisions and the quantitative analysis of cDNA microarray images. *Biomedical Optics,* 1997, 2(4), pp 364-74.
12. Kalocsai, P., and Shams, S., Use of Bioinformatics in Arrays, *Methods Mol Biol,* 2001, 170, p. 223-36.
13. Bishop, J. O., J. G. Morton, et al., Three abundance classes in Hela cell messenger RNA. 1974, *Nature,* 250 (463): 199-240
14. Duggan, D. J., Bittner, M. L., Chen, Y., Meltzer, P. S., and Trent J. M., Expression profiling using cDNA microarrays. *Nat Genet,* 1999. 21(1 Suppl): p. 10-4.
15. Kerr, M. K. and G. A. Churchill, Statistical design and the analysis of gene expression microarray data. *Genet Res,* 2001. 77(2): p. 123-8
16. Rost, F. W. D, *Fluorescence Microscopy,* Cambridge Univ. Press, 1995.
17. Eisen, M. B., Spellman, P. T., Brown, P. O., and Botstein, D, Cluster analysis and display of genome-wide expression patterns. *Proceedings of the National Academy of Sience USA* 95, pp 14863-14868, 1998.
18. Ben-Dor, A., Shamir, R., and Yakhini, Z, Clustering gene expression patterns. *Computational Biology,* 1999, 6(3/4), pp 281-297.
19. Pablo Tamayo, Donna Slonim, Jill Mesirov, Qing Zhu, Sutisak Kitareewan, Ethan Dmitrovsky, Eric S. Lander, and Todd R. Golub, Interpreting Pattern of Gene Expression with Self-Organizing Maps: Methods and Application to Hematopoietic Differentiation. *Proc Natl Acad Sci USA,* 96(6) p. 2907-12, 1999.
20. Kim, S., Dougherty, E. R., Bittner, M. L., Chen; Y., Sivakumar, K., Meltzer, P, and J. M. Trent, A General Framework for the Analysis of Multivariate Gene Interaction via Expression Arrays. 2000, *Biomedical Optics,* 5(4), 411-24.
21. Kim, S., Dougherty, E. R., Chen, Y., Sivakumar, K., Meltzer, P., Trent, J. M., and M. Bittner, Multivariate Measurement of Gene-Expression Relationships. 2000, *Genomics,* 67, pp 201-9.
22. Stoyan, D., Kendall, W. S., and J. Mecke, *Stochastic Geometry and Its Applications,* John Wiley, Chichester, 1995.
23. Jeulin, D., ed., *Advances in Theory and Applications of Random Sets,* World Scientific Publishing Company, New York, 1997.
24. Dougherty, E. R., *Random Processes for Image and Signal Processing,* SPIE and IEEE Presses, Bellingham, 1999.
25. Robert P. Loce and E. R. Dougherty, *Enhancement and Restoration of Digital Documents,* SPIE Optical Engineering Press, Bellingham, 1997.

What is claimed is:

1. A method of generating a simulated microarray image, the method comprising:
   receiving a plurality of simulation parameters; and
   generating the simulated microarray image based at least on the simulation parameters.

2. A computer-readable medium comprising computer-executable instructions for performing the method of claim 1.

3. A method comprising:
   generating a simulated microarray image based on simulation parameters, wherein the simulated microarray image is associated with known values; and
   analyzing the simulated microarray image via a microarray imaging procedure, the analyzing comprising calculating observed values.

4. A computer-readable medium having computer-executable instructions for performing the method of claim 3.

5. The method of claim 3 further comprising:
   comparing the known values with the observed values to benchmark the microarray imaging procedure.

6. The method of claim 3 wherein the values comprise spot intensity values.

7. The method of claim 6 further comprising:
   generating a rating based on results of the comparing, wherein the rating indicates effectiveness of the microarray imaging procedure.

8. The method of claim 3 wherein the generating comprises simulating a fluorescent background level for the simulated microarray image.

9. The method of claim 3 wherein the generating comprises simulating spots for the simulated microarray image.

10. The method of claim 3 wherein the generating comprises simulating post-processing phenomena for the simulated microarray image.

11. A method for simulating a microarray, comprising:
    defining a plurality of parameters;
    generating a simulated microarray according to the parameters using an imaging procedure;
    comparing the simulated microarray to a known value; and
    evaluating the imaging procedure in response to the comparison.

12. A computer-readable medium having computer-executable instructions for performing the method of claim 11.

13. A computer-implemented method of generating a simulated microarray image, the method comprising:
   receiving a plurality of simulation parameters; and
   generating the simulated microarray image based at least on the simulation parameters.

14. The computer-implemented method of claim 13 wherein the simulated microarray image is associated with known values, the method further comprising:
   analyzing the simulated microarray image via a microarray imaging procedure, the analyzing comprising calculating observed values; and
   comparing the known values with the observed values to benchmark the microarray imaging procedure.

15. The computer-implemented method of claim 14 wherein:
   the known values comprise signal intensities;
   the observed values comprise signal intensities; and
   the comparing compares the signal intensities of the known values with the signal intensities of the observed values.

16. The computer-implemented method of claim 13 wherein the simulated microarray image simulates random perturbations in array preparation, printing, and scanning.

17. The computer-implemented method of claim 13 wherein the simulated microarray image simulates background noise.

18. The computer-implemented method of claim 13 wherein the simulated microarray image simulates radius variation of cDNA deposition spots.

19. The computer-implemented method of claim 13 wherein the simulated microarray image simulates spot drift of cDNA deposition spots.

20. The computer-implemented method of claim 13 wherein the simulated microarray image simulates center core variation of cDNA deposition spots.

21. The computer-implemented method of claim 13 wherein the simulated microarray image simulates chord removal of cDNA deposition spots.

22. The computer-implemented method of claim 13 wherein the simulated microarray image simulates edge noise of cDNA deposition spots.

23. The computer-implemented method of claim 13 wherein the simulated microarray image simulates edge enhancement of cDNA deposition spots.

24. The computer-implemented method of claim 13 wherein the simulated microarray image simulates signal intensity.

25. The computer-implemented method of claim 13 wherein the simulated microarray image simulates channel conditioning.

26. The computer-implemented method of claim 13 wherein the simulated microarray image simulates spike noise.

27. The computer-implemented method of claim 13 wherein the simulated microarray image simulates scratch noise.

28. The computer-implemented method of claim 13 wherein the simulated microarray image simulates snake noise.

29. The computer-implemented method of claim 13 wherein the simulated microarray image simulates smoothing.

30. The computer-implemented method of claim 13 wherein the generating comprises randomization at a spot level of the simulated microarray image.

31. The computer-implemented method of claim 13 wherein the generating comprises randomization at a block level of the simulated microarray image.

32. The computer-implemented method of claim 13 wherein the generating comprises randomization at an array level of the simulated microarray image.

33. A computer-readable medium comprising computer-executable instructions for performing a computer-implemented method of generating a simulated microarray image, the method comprising:
   receiving a plurality of simulation parameters; and
   generating the simulated microarray image based at least on the simulation parameters.

* * * * *

UNITED STATES PATENT AND TRADEMARK OFFICE
CERTIFICATE OF CORRECTION

PATENT NO. : 7,363,169 B2  Page 1 of 1
APPLICATION NO. : 10/501848
DATED : April 22, 2008
INVENTOR(S) : Dougherty et al.

It is certified that error appears in the above-identified patent and that said Letters Patent is hereby corrected as shown below:

In the Specification:

Column 9, line 32, "[0, 1.01]." should read --[0, 1.0].--.

Column 9, line 65, "αis" should read --α is--.

Column 10, formula 2, "$t_k = 10^{+b_k}$" should read -- $t_k = 10^{\pm b_k}$ --.

Column 10, line 30, "$\sigma_R^2$" should read -- $\sigma_{R_k}^2$ --.

Column 10, line 31, "$U[f_{a_1}],[b_1]$" should read -- $U[f_{a_1}, f_{b_1}]$ --.

Column 10, line 34, "$a_{s_2} \sim U[f_{c_2}, f_{d_2}].$" should read -- $a_{s_2} \sim U[f_{c_2}, f_{d_2}].$ --.

Column 10, line 56, "$a_3 1$." should read --$a_3 = 1$.--.

Column 10, line 67, "$f(x) = a_3[a_0 + x(1 - e^{-x/a_1})^{a_2}]; a_3 > 1$" should read
-- $f(x) = a_3\left[a_0 + x\left(1 - e^{-x/a_1}\right)^{a_2}\right]; a_3 > 1$ --.

Column 14, line 50, "set a the" should read --set at the--.

Column 19, line 22, "(25, 2 5)" should read --(25, 25)--.

Column 21, line 50, "p. 10-4." should read --p. 10-14.--.

Signed and Sealed this

Sixth Day of July, 2010

David J. Kappos
*Director of the United States Patent and Trademark Office*